(12) United States Patent
Iwasa

(10) Patent No.: US 7,911,721 B2
(45) Date of Patent: Mar. 22, 2011

(54) LENS BARREL

(75) Inventor: Kazuyuki Iwasa, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 256 days.

(21) Appl. No.: 12/250,335

(22) Filed: Oct. 13, 2008

(65) Prior Publication Data

US 2009/0097141 A1 Apr. 16, 2009

(30) Foreign Application Priority Data

Oct. 16, 2007 (JP) ................................ 2007-269535

(51) Int. Cl.
*G02B 7/02* (2006.01)
(52) U.S. Cl. ....................................... 359/823; 359/694
(58) Field of Classification Search .................. 359/694, 359/823
See application file for complete search history.

(56) References Cited

U.S. PATENT DOCUMENTS

| 4,002,405 A * | 1/1977 | Stahl ............................. 359/697 |
| 4,626,077 A * | 12/1986 | Yamamoto .................... 359/696 |
| 5,052,781 A * | 10/1991 | Iizuka ........................... 359/823 |
| 5,576,894 A * | 11/1996 | Kuwana et al. ................ 359/701 |
| 2005/0219719 A1 * | 10/2005 | Kawai ........................... 359/819 |

FOREIGN PATENT DOCUMENTS

| JP | 02-253210 | 10/1990 |
| JP | 08-114739 | 5/1996 |

* cited by examiner

*Primary Examiner* — Jessica T Stultz
(74) *Attorney, Agent, or Firm* — Straub & Pokotylo; John C. Pokotylo

(57) ABSTRACT

The present invention includes: a taking lens including a lens group; a distance ring that is operated to rotate around the taking lens; an LD roller capable of rotating in conjunction with the rotational operation of the distance ring; a transducer that is in contact with the LD roller and capable of moving around the taking lens relative to the LD roller; and a rotatable frame member that is capable of moving around the taking lens within a predetermined angle range and supports the transducer, upon the distance ring being rotated manually, the rotatable frame member being rotated via the LD roller and the transducer, and upon the transducer being driven by a drive signal, the transducer moving relative to the LD roller, thereby the rotatable frame member being rotated around the taking lens to move a focusing lens in the taking lens to move in an optical axis direction.

8 Claims, 35 Drawing Sheets

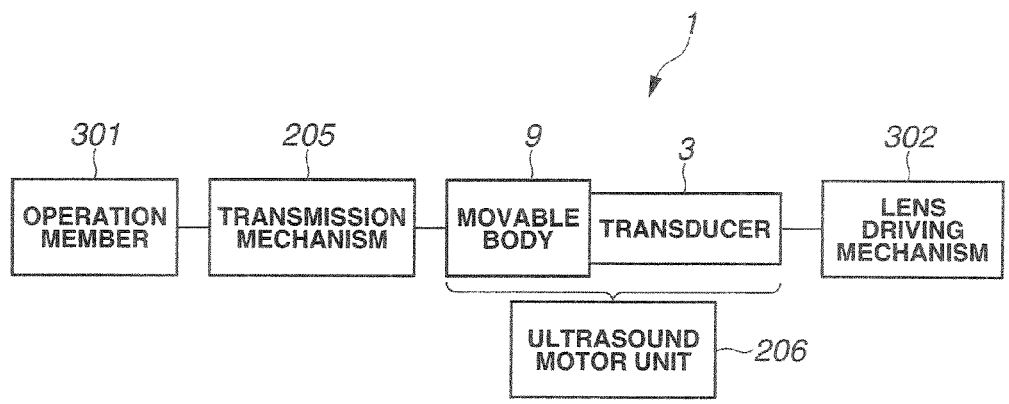
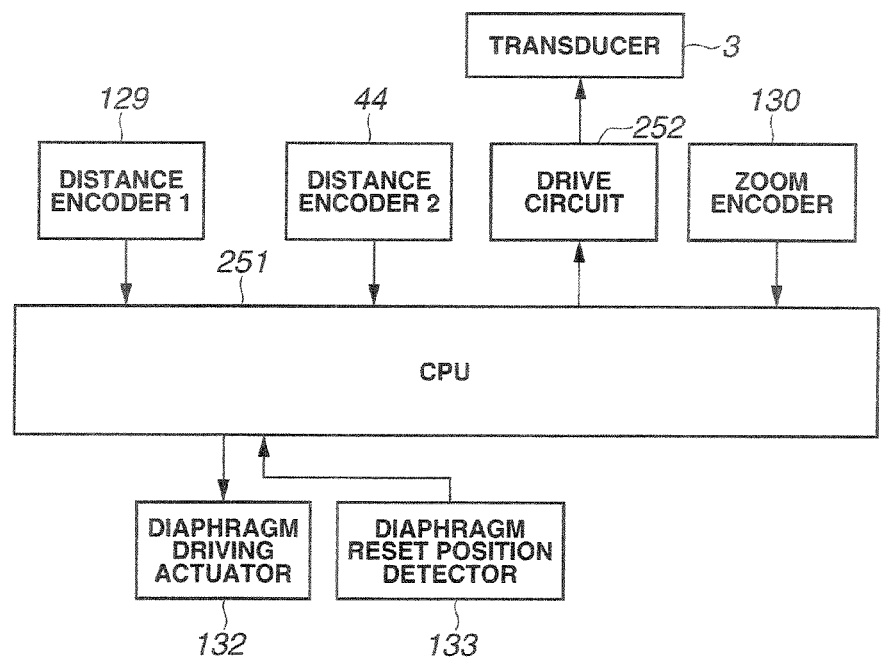

LENS BARREL

CROSS REFERENCE TO RELATED APPLICATION

This application claims benefit of Japanese Patent Application No. 2007-269535 filed in Japan on Oct. 16, 2007, the contents of which are incorporated by this reference.

BACKGROUND OF THE INVENTION

1. Field of the Invention

The present invention relates to a lens barrel that drives frame members, which hold an optical system, to advance/withdraw.

2. Description of the Related Art

Japanese Patent Nos. 3501176 and 2597707 each discloses a conventional lens barrel that can perform focusing by means of manual and automatic operation without special switching operation. As shown in the block configuration diagram in FIG. 50, the lens barrel according to Japanese Patent No. 3501176 is configured so that: a lens driving mechanism 315 that drives a focus lens in a photographing optical system to advance/withdraw for focusing can be driven to rotate by an ultrasound motor (e.g., surface wave motor) including a transducer 313 and a movable body (e.g., a rotor) 314; and also, the lens driving mechanism 315 can be manually operated to rotate via the movable body 314 by driving the transducer 313 by means of an operation member (e.g., a manual operation ring) 311 via a transmission mechanism 312.

As shown in the block configuration diagram in FIG. 51, the lens barrel according to Japanese Patent No. 2597707 is configured so that a lens driving mechanism (e.g., a focusing mechanism) 325 that drives a focus lens in a photographing optical system to advance/withdraw for focusing can be driven to rotate by an ultrasound motor (e.g., a surface wave motor) including transducer 323 and a movable body (e.g., a rotor) 324, while the lens driving mechanism 325 can be manually operated to rotate by an operation member (e.g., a manual operation ring) 321 via a transmission mechanism 322.

SUMMARY OF THE INVENTION

A lens barrel according to a first aspect of the present invention comprises: an optical system; an operation ring to be operated to rotate around the optical system; a rotary member capable of rotating in conjunction with the rotational operation of the operation ring; a transducer that is in contact with the rotary member and is capable of moving around the optical system relative to the rotary member; and a rotatable frame member that is capable of moving around the optical system within a predetermined angle range and supports the transducer, upon the operation ring being rotated manually, the rotatable frame member being rotated via the rotary member and the transducer, and upon the transducer being driven by a drive signal, the transducer moving relative to the rotary member, thereby the rotatable frame member being rotated around the optical system to move at least a part of the optical system in an optical axis direction.

A lens barrel according to a second aspect of the present invention provides the lens barrel according to the first aspect wherein the transducer is provided with the drive signal by a flexible printed circuit board.

A lens barrel according to a third aspect of the present invention provides the lens barrel according to the first aspect wherein the transducer includes a rectangular parallelepipedal drive element and a plurality of the transducers are provided on the frame member.

A lens barrel according to a fourth aspect of the present invention provides the lens barrel according to the first aspect wherein the part of the optical system is an optical system for focusing.

A lens barrel according to a fifth aspect of the present invention provides the lens barrel according to the first aspect wherein a transmission mechanism is provided between the operation ring and the rotary member.

A lens barrel according to a sixth aspect of the present invention provides the lens barrel according to the first aspect further comprising control means for performing control to provide the drive signal to the transducer.

A lens barrel according to a seventh aspect of the present invention provides the lens barrel according to the first aspect wherein whether or not the transducer is driven, the operation ring can arbitrarily be operated.

BRIEF DESCRIPTION OF THE DRAWINGS

FIG. 1 is a block diagram of a configuration of a lens driving mechanism driving system in a lens barrel according to an embodiment of the present invention;

FIG. 2 is a block diagram of an electrical control configuration in the lens barrel according to the embodiment;

FIG. 45A shows an infinity focusing state, and FIG. 45B shows a close distance focusing state;

FIG. 46A shows an infinity focusing state, and FIG. 46B shows a close distance focusing state;

FIG. 47A shows a wide-angle state, and FIG. 47B shows a telephoto state;

DETAILED DESCRIPTION OF THE PREFERRED EMBODIMENTS

Figure 3:
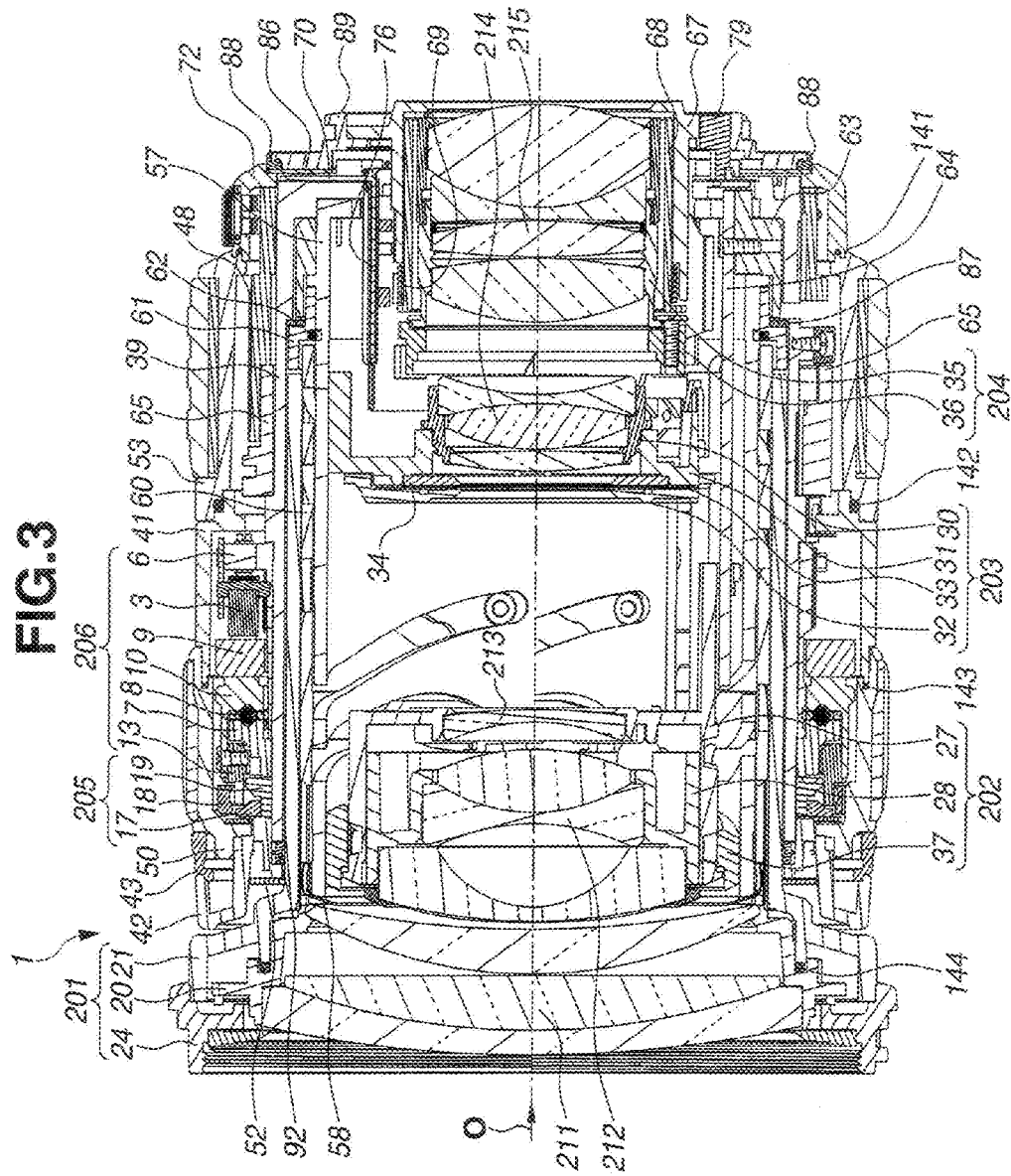
FIG. 3 is a cross-sectional view of the lens barrel according to the embodiment taken along a plane passing through the centers of transducers, an optical axis, and the centers of focus interlock keys (a cross-sectional view taken along A-A of FIG. 4)

An embodiment of the present invention will be described with reference to the drawings.

FIG. 1 is a block diagram of a configuration of a lens driving mechanism driving system in a lens barrel according to an embodiment of the present invention. FIG. 2 is a block diagram of a configuration of an electrical control section of the lens barrel according to the embodiment.

A lens barrel 1 in the present embodiment is a zoom lens barrel that is attachable/detachable to/from a single-lens reflex camera, in which zoom driving can be performed and as shown in FIG. 1, a focus lens group (for example, a second lens group) can be driven to advance/withdraw by an ultrasound motor via a lens driving mechanism 302. Hereinafter, lens driving may occasionally be abbreviated as "LD". Transducers 3 in an ultrasound motor unit 206 are in contact with an LD rotor 9, which is a movable body, and the transducers 3 are connected to the lens driving mechanism (for example, an LD frame, an outer interlock ring, etc.) 302. During autofocusing (hereinafter, referred to as "AF"), the ultrasound motor unit 206 is driven under the control of a CPU 251, which is a control unit, to rotationally move the transducers 3 circumferentially around the optical axis of the lens relative to the movable body (for example, an LD rotor, which is a rotary member) 9. As a result of the relative movement of the transducers 3, the lens driving mechanism 302 is driven to rotate, thereby the focusing lens group moves to a focal position. Meanwhile, during manual focusing (hereinafter referred to as "MF"), no switching operation is performed and an operation member (for example, a distance ring, which is an operation ring) 301 is manually operated to rotate circumferentially around the optical axis of the lens to rotate the movable body 9 via a transmission mechanism (for example, a ball and a ball receiver, etc.) 205, thereby the lens driving mechanism 302 is driven to rotate integrally with the transducers 3 that are in contact with the movable body 9 to move the focusing lens group forward/backward.

The lens barrel 1 includes an electrical control system as shown in the block configuration diagram in FIG. 2, in which various control operations are performed under the control of the CPU 251. In other words, during a zooming operation, as a result of an operation to rotate a zoom ring, the zoom movement amount is loaded by a zoom encoder 130 to the CPU 251. During an AF operation, based on an AF control signal generated by the CPU 251 from subject distance information loaded from an AF detection section (not shown), the transducers 3, which are connected via a transducer flexible printed circuit board (hereinafter, a flexible printed circuit board is referred to as "FPC"), are driven by a drive circuit 252 to move the focus lens to a focal position. Also, during an MF operation, the distance ring is operated to rotate to drive the focus lens to advance/withdraw. For calculation of a movement amount of the focus lens, distance data from a first distance encoder (for example, an encoder plate and an encoder FPC) 129 and high-resolution distance data from a second distance encoder (for example, an optical encoder and an SMD scale) 44 are loaded to the CPU 251. Diaphragm blades for a taking lens are driven to open/close by a diaphragm driving actuator 132 based on an instruction from the CPU 251. The initial position of the diaphragm blades in an open state is detected by a diaphragm reset position detector 133. Here, "SMD" means a surface mount device.

As described above, in the lens barrel 1 according to the present embodiment, both AF and MF operations can be performed at any time without switching operations.

Hereinafter, a detailed configuration and operation of the lens barrel 1 according to the present embodiment will be described with reference to FIGS. 3 to 49.

Figure 4:
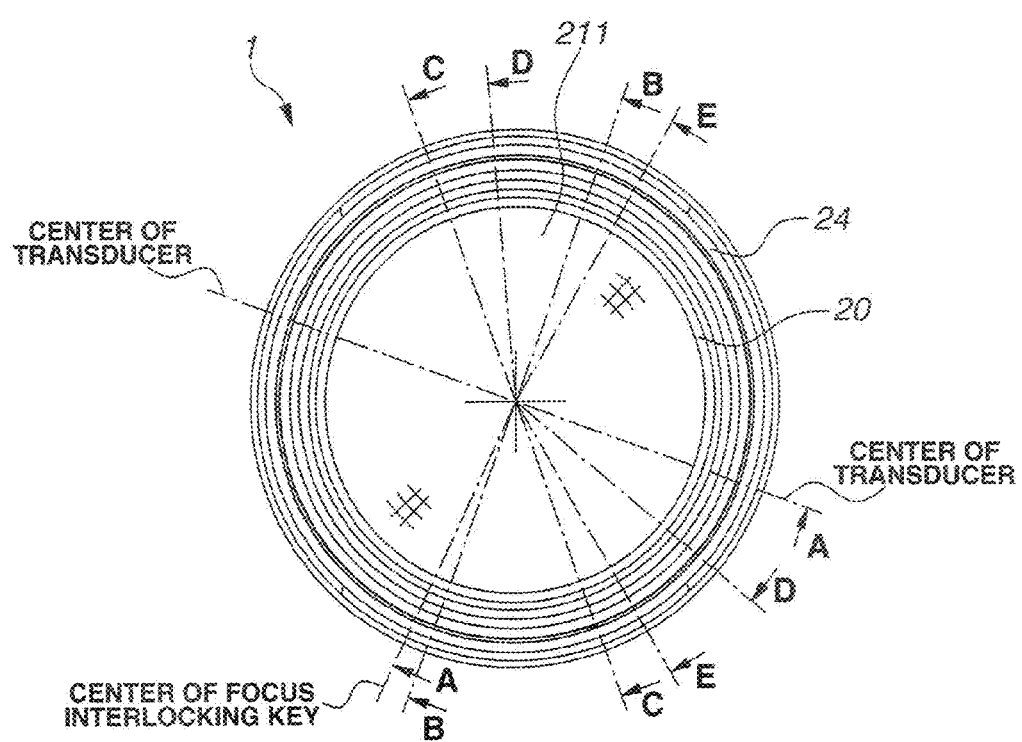
FIG. 4 is a front view of the lens barrel in FIG. 3.
Figure 5:
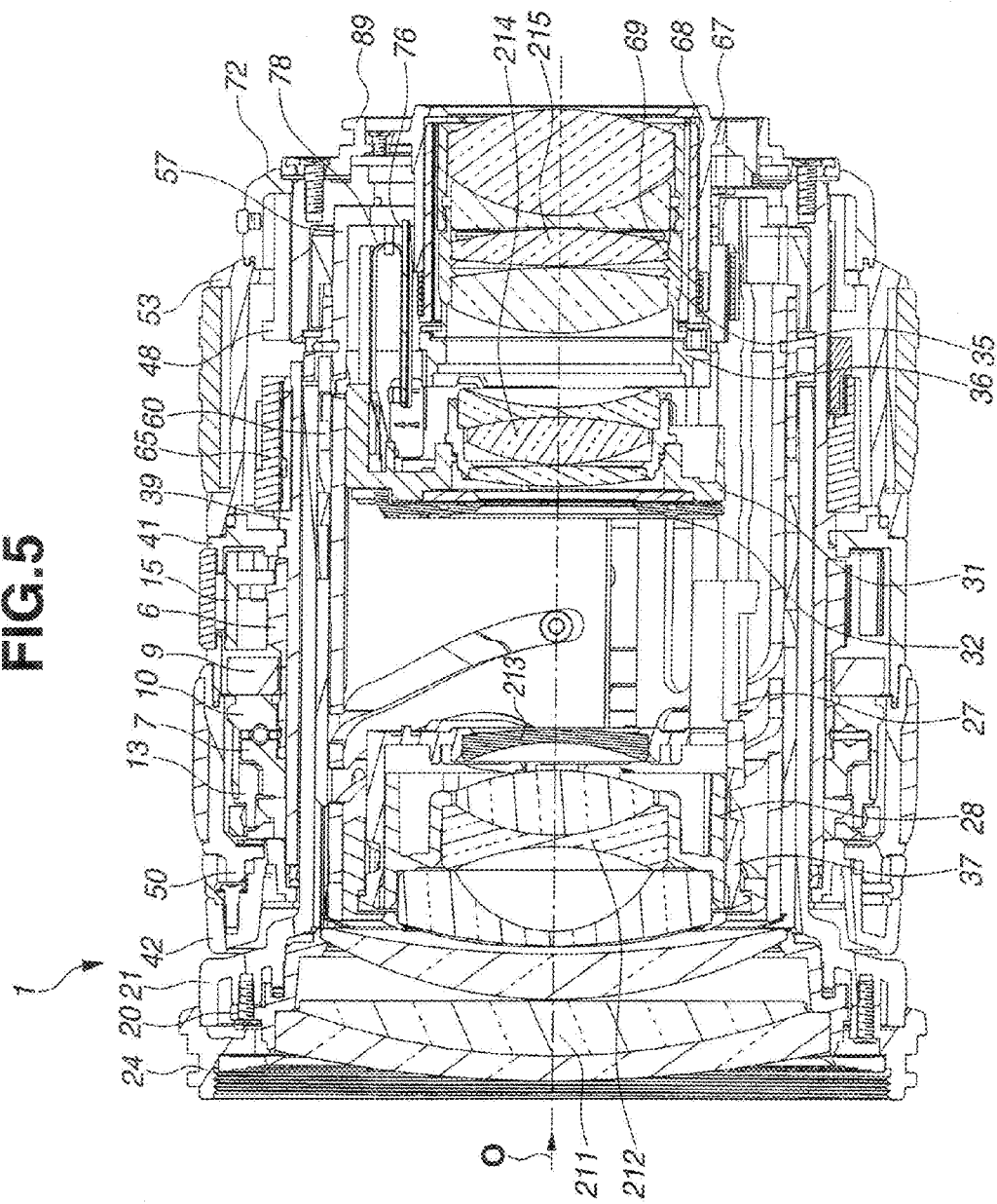
FIG. 5 is a longitudinal cross-sectional view of the lens barrel in FIG. 3 in a wide-angle and infinite focusing state.
Figure 6:
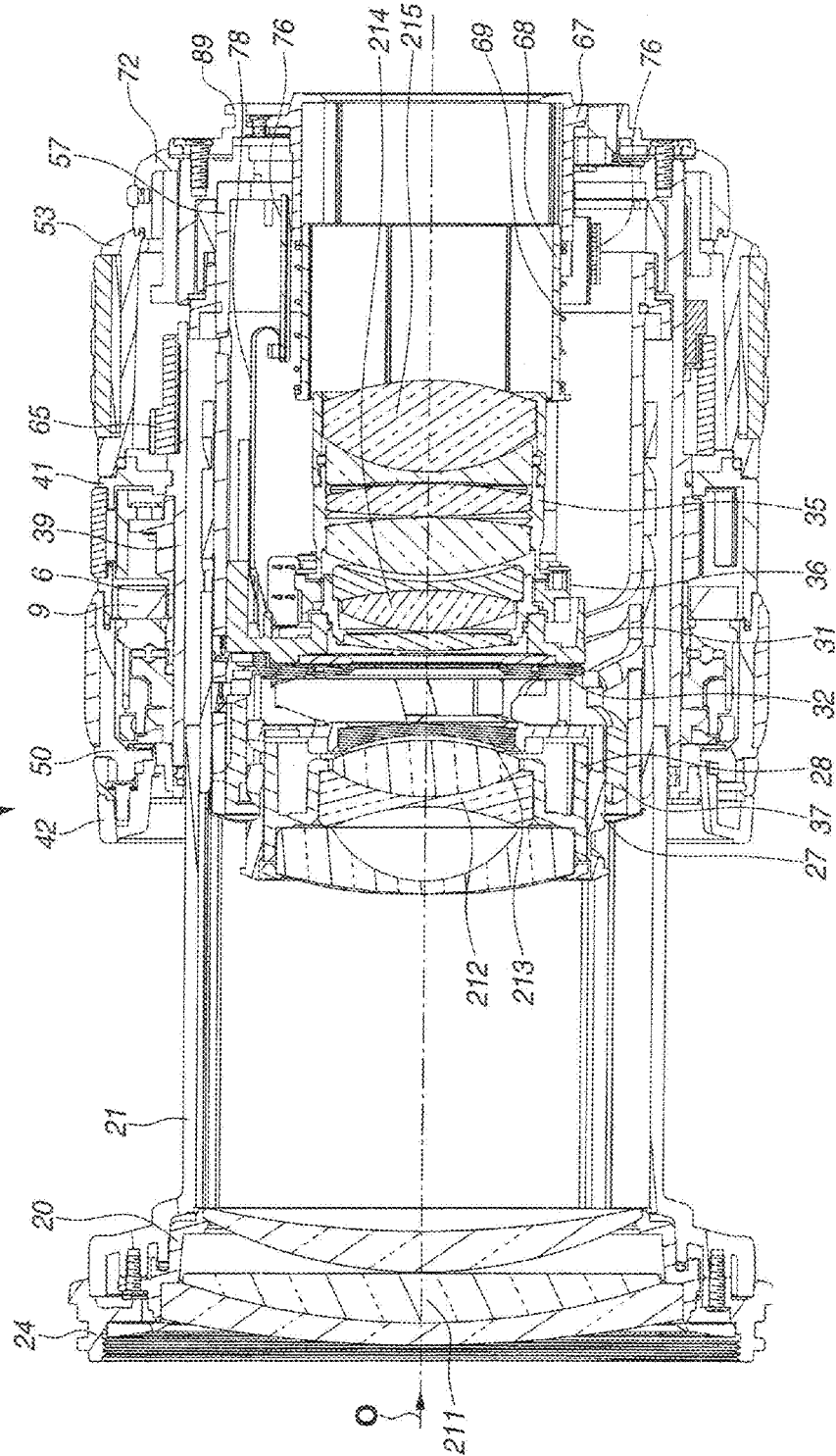
FIG. 6 is a longitudinal cross-sectional view of the lens barrel in FIG. 3 in a telephoto and close focusing state.
Figure 7:
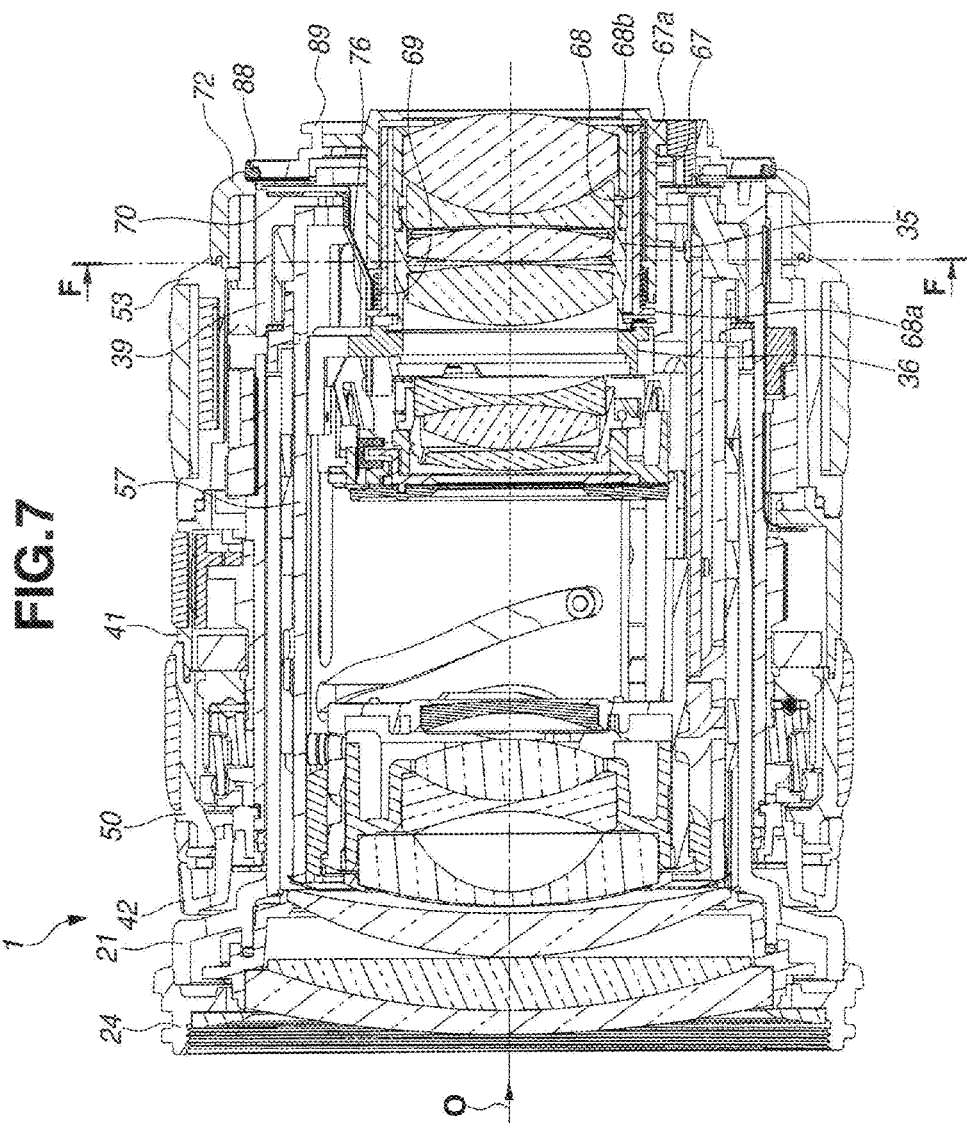
FIG. 7 is a cross-sectional view taken along B-B of FIG. 4, which specifically shows a detailed cross-sectional view of a portion around cover rings.
Figure 8:
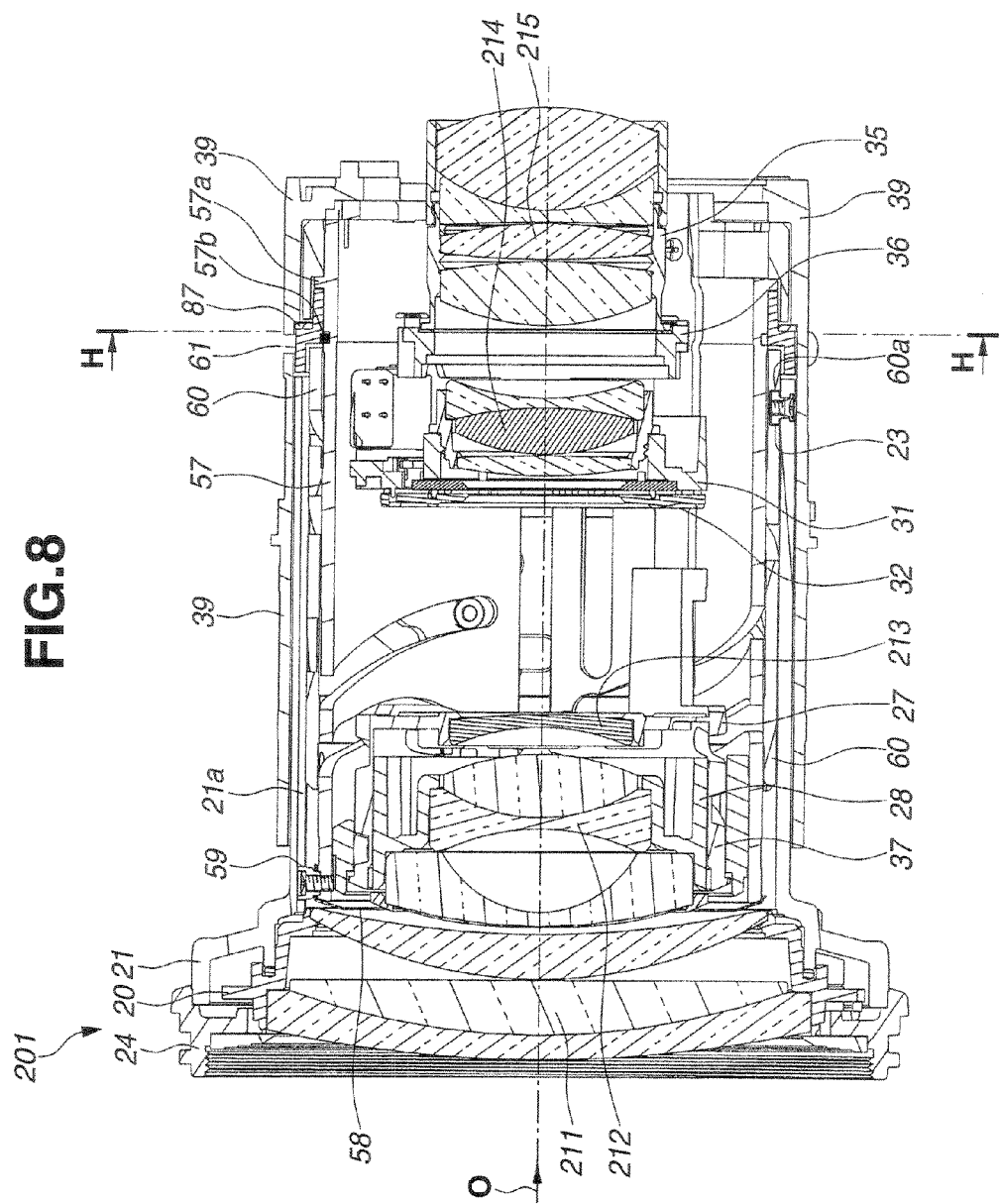
FIG. 8 is a cross-sectional view taken along C-C of FIG. 4, which shows a detailed cross-sectional view of a portion around a cam driving ring.
Figure 9:
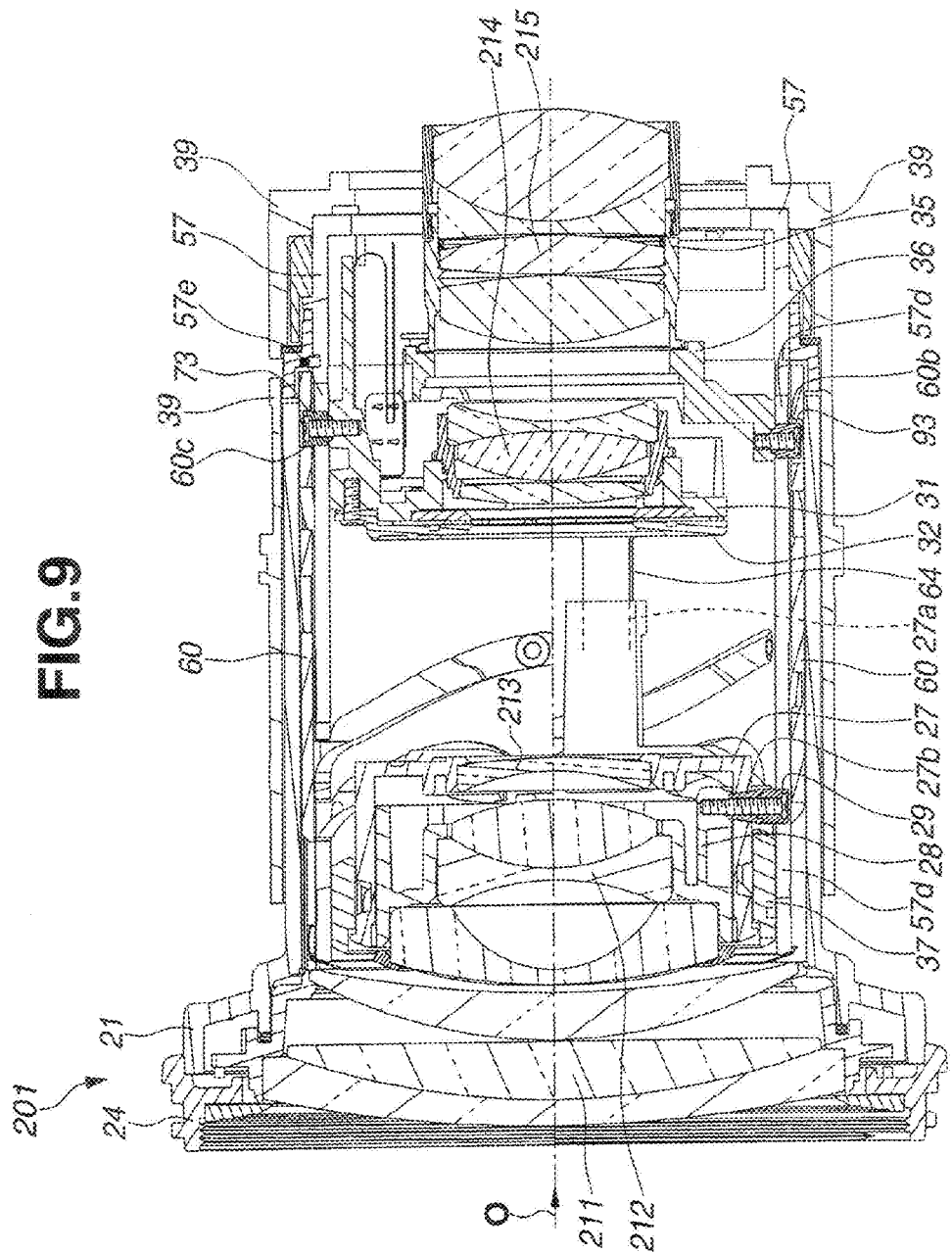
FIG. 9 is a cross-sectional view taken along D-D of FIG. 4, which shows a detailed cross-sectional view of cam follower portions of front and rear second group frames and a third group frame.
Figure 10:
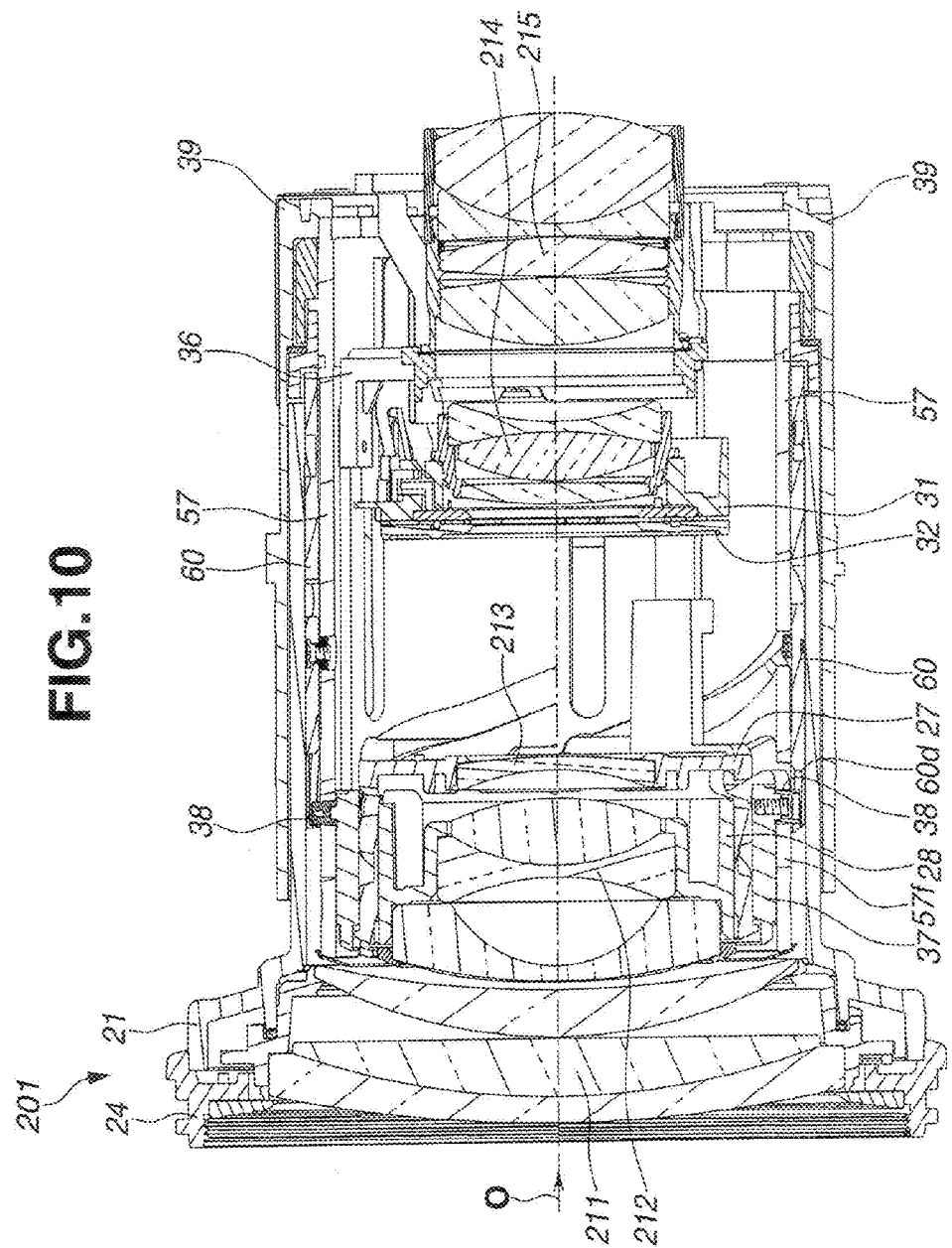
FIG. 10 is a cross-sectional view taken along E-E of FIG. 4, which shows a detailed cross-sectional view of cam follower portions of a cam frame and a 2Z frame.
Figure 11:
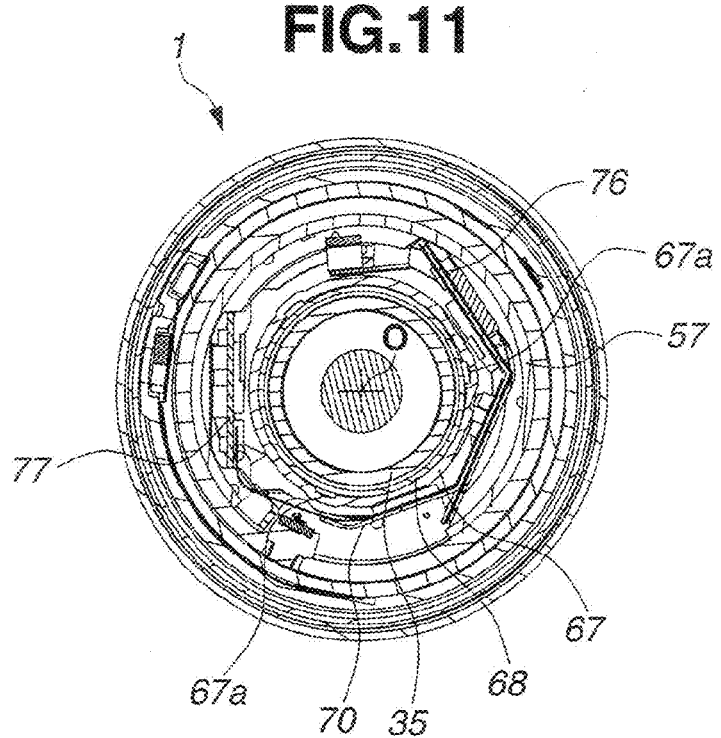
FIG. 11 is a cross-sectional view taken along F-F of FIG. 7.
Figure 12:
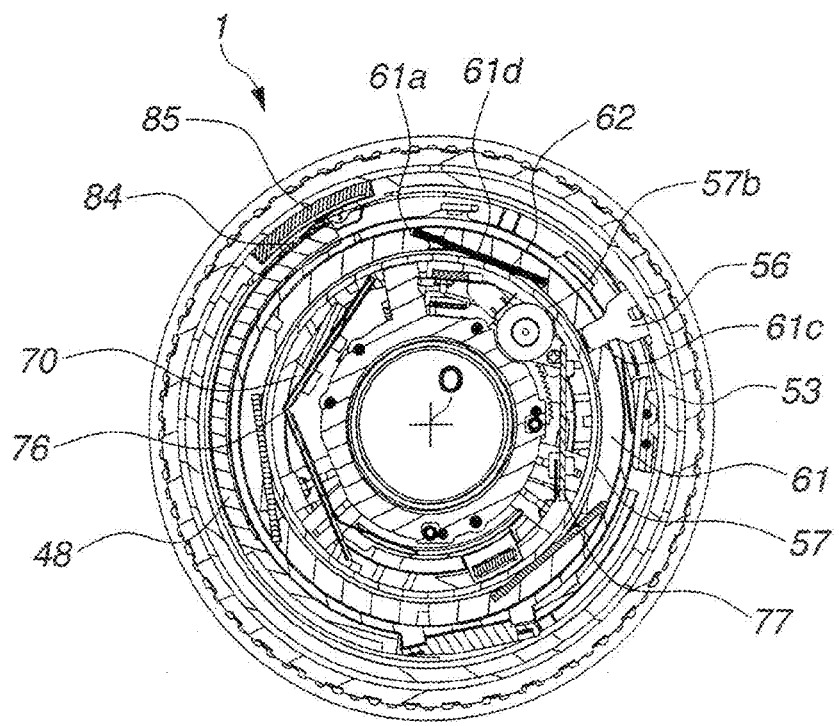
FIG. 12 is a cross-sectional view taken along H-H of FIG. 8.

FIGS. 3 to 12 are cross-sectional views along an optical axis and front views, or cross-sectional views perpendicular to an optical axis, of the lens barrel according to the present embodiment: FIG. 3 is a cross-sectional view taken along A-A of FIG. 4, illustrating a cross section taken along a plane passing through the centers of transducers, an optical axis and the centers of focus interlock keys; FIG. 4 is a front view of the lens barrel in FIG. 3; FIG. 5 is a longitudinal cross-sectional view of the lens barrel in a wide-angle and infinite focusing state; FIG. 6 is a longitudinal cross-sectional view of the lens barrel in a telephoto and close focusing state; FIG. 7 is a cross-sectional view taken along B-B of FIG. 4, which specifically shows a detailed cross-sectional view of a portion around cover rings; FIG. 8 is a cross-sectional view taken along C-C of FIG. 4, which shows a detailed cross-sectional view of a portion around a cam driving ring; FIG. 9 is a cross-sectional view taken along D-D of FIG. 4, which shows a detailed cross-sectional view of cam follower portions of front and rear second group frames and a third group frame; FIG. 10 is a cross-sectional view taken along E-E of FIG. 4, which specifically shows a detailed cross-sectional view of cam follower portions of a cam frame and a 2Z frame; FIG. 11 is a cross-sectional view taken along F-F of FIG. 7; and FIG. 12 is a cross-sectional view taken along H-H of FIG. 8.

Figure 13:
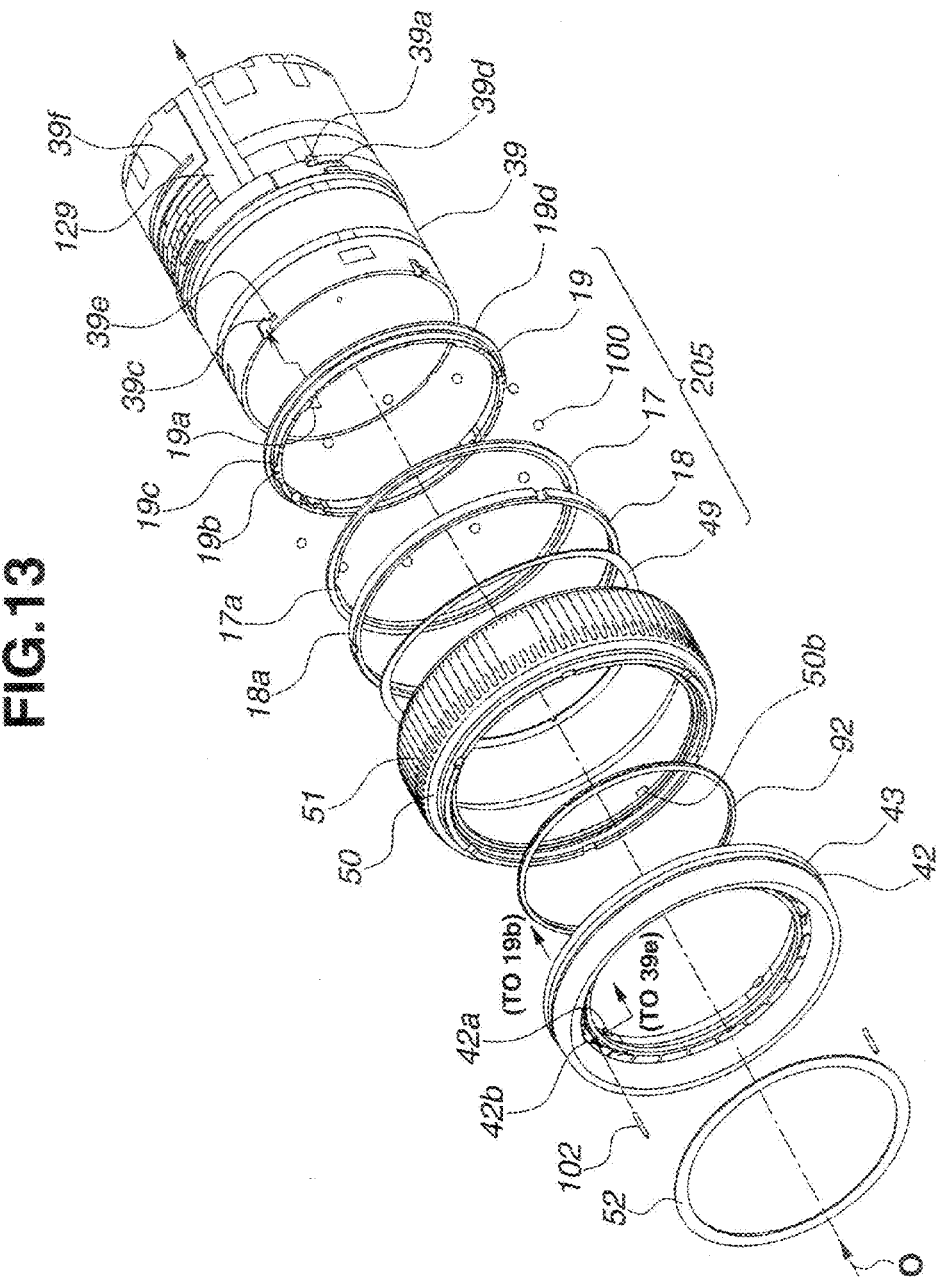
FIG. 13 is an exploded perspective view of members of the lens barrel in FIG. 3, which include a distance ring, a transmission mechanism and a main frame, viewed from the front side of an optical axis.
Figure 14:
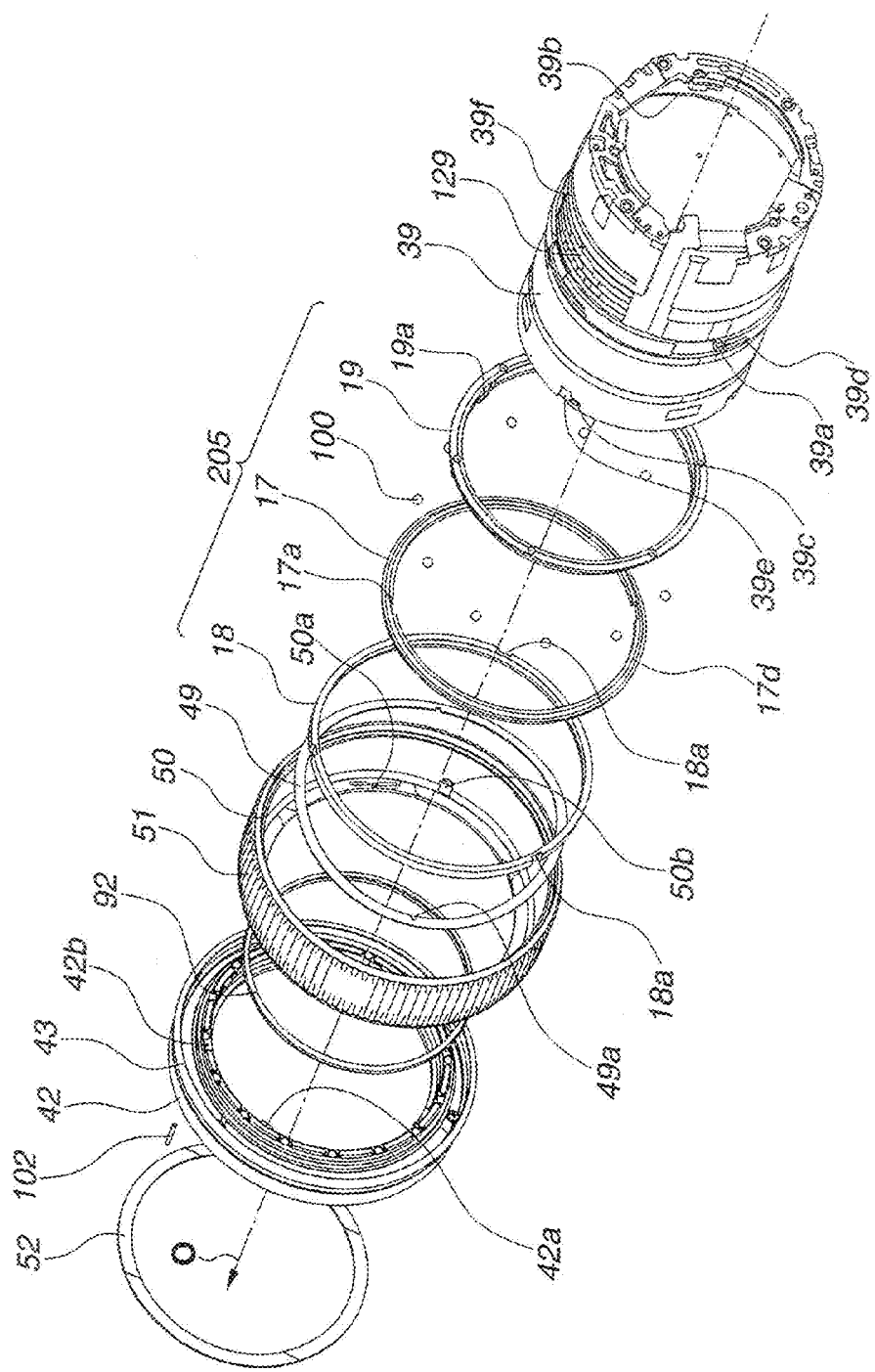
FIG. 14 is an exploded perspective view of members of the lens barrel in FIG. 3, which include a distance ring, a transmission mechanism and a main frame, viewed from the rear side of an optical axis.
Figure 15:
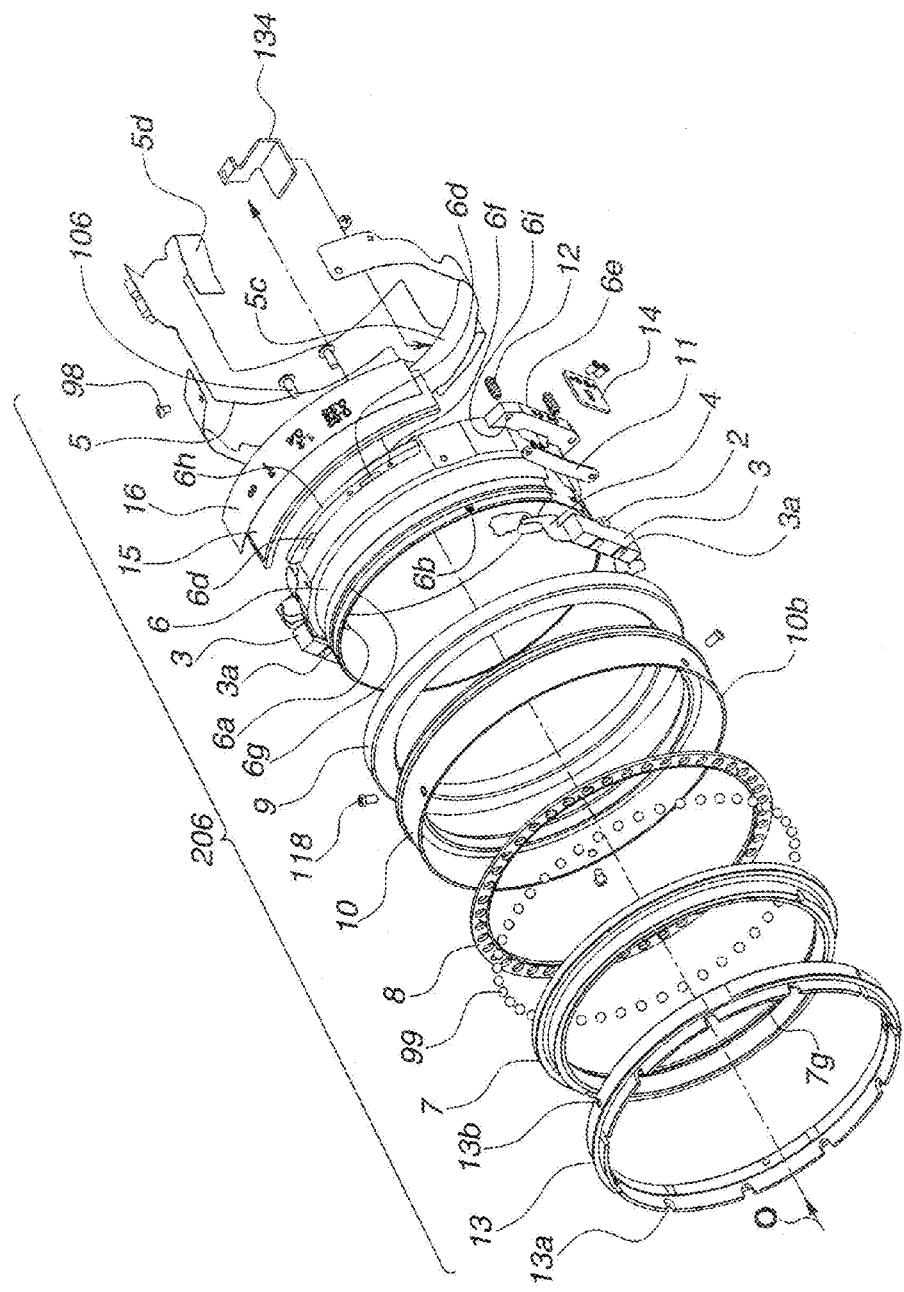
FIG. 15 is an exploded perspective view of an ultrasound motor unit in the lens barrel in FIG. 3.
Figure 16:
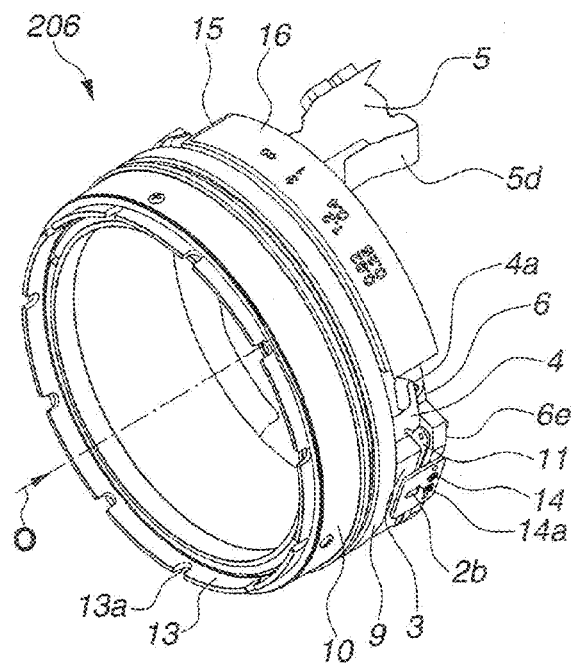
FIG. 16 is a perspective view of an ultrasound motor unit of the lens barrel in FIG. 3, viewed from the front side of an optical axis.
Figure 17:
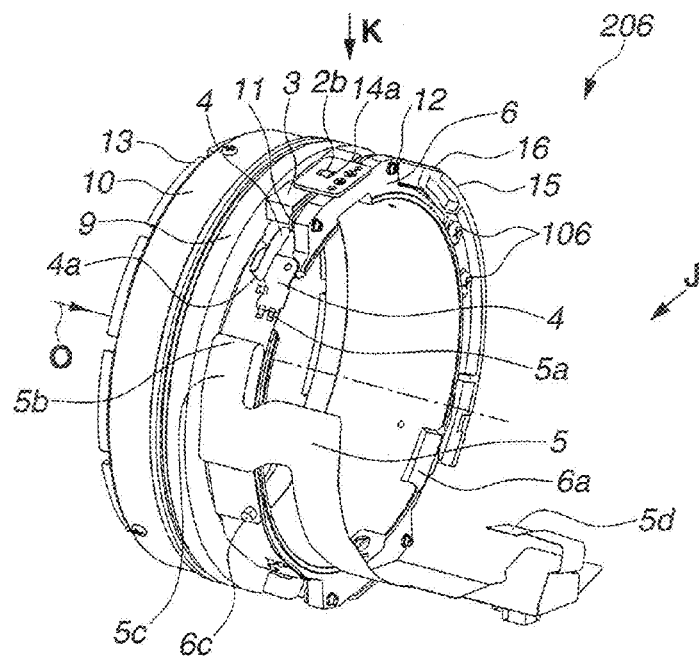
FIG. 17 is a perspective view of an ultrasound motor unit of the lens barrel in FIG. 3, viewed from the rear side of an optical axis.
Figure 18:
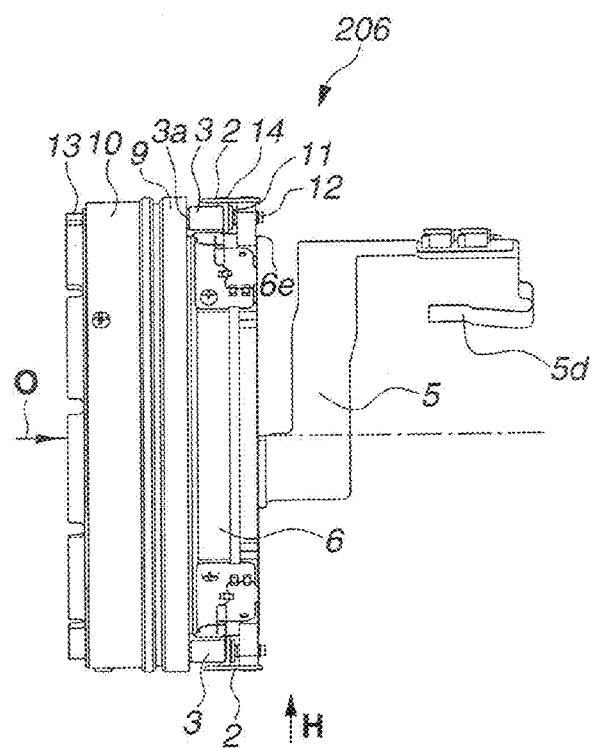
FIG. 18 is a view taken in the direction of arrow J in FIG. 17.
Figure 19:
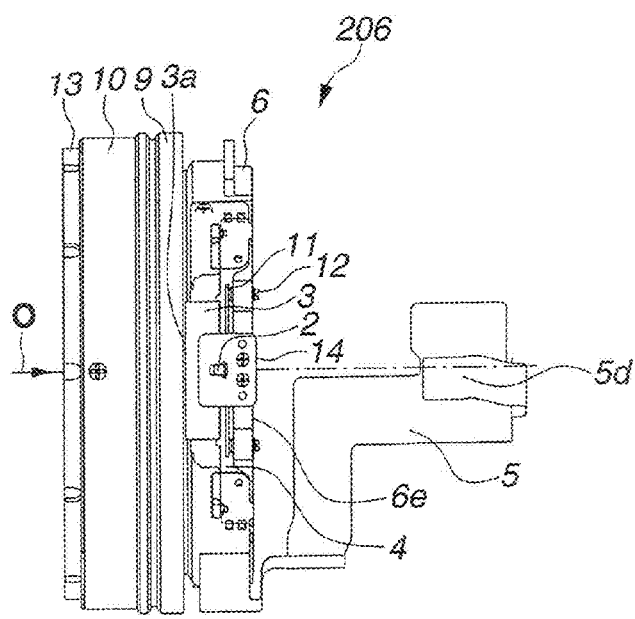
FIG. 19 is a view taken in the direction of arrow K in FIG. 17.
Figure 20:
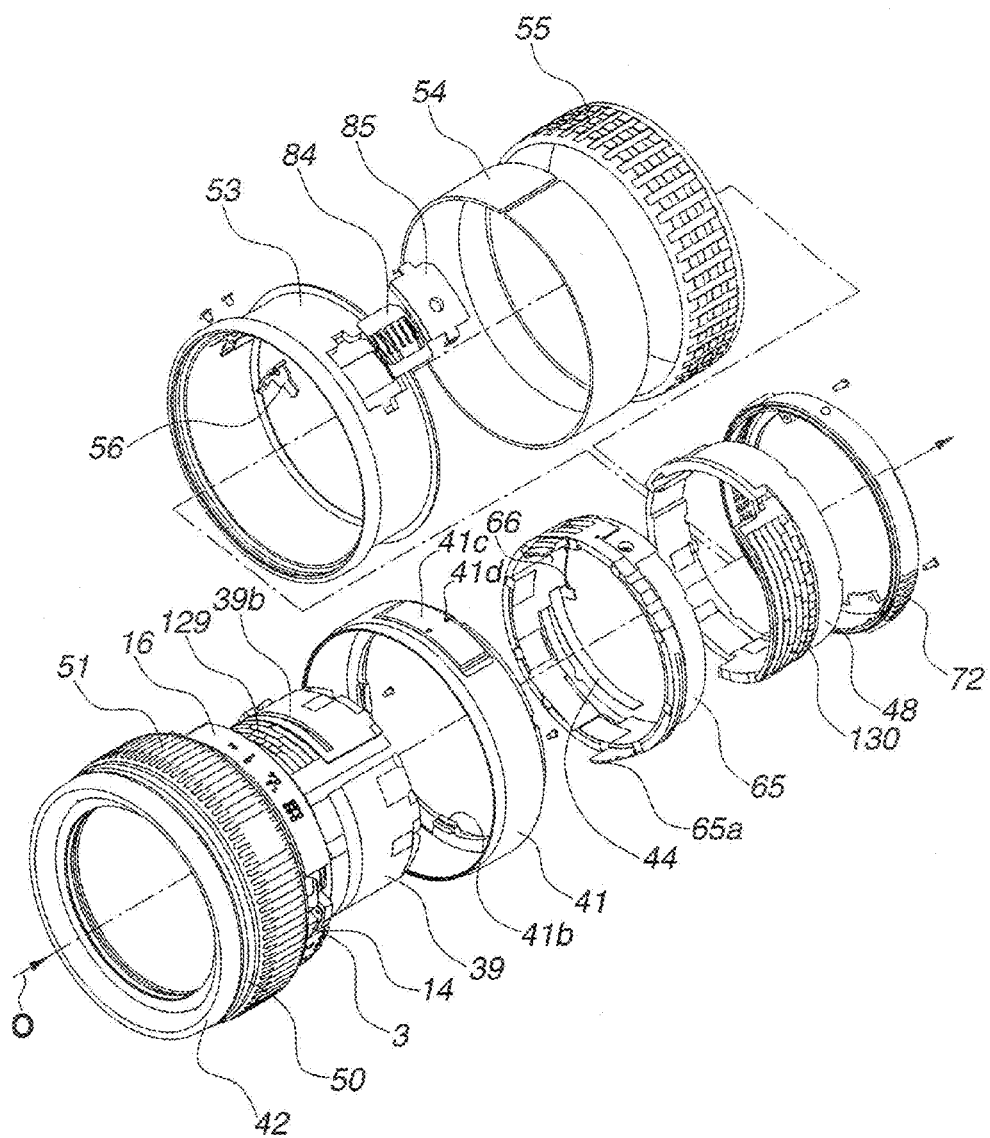
FIG. 20 is an exploded perspective view of a distance ring, an ultrasound motor unit, a middle cover, a zoom ring, a zoom base and a rear cover of the lens barrel in FIG. 3, viewed from the front side of an optical axis.
Figure 21:
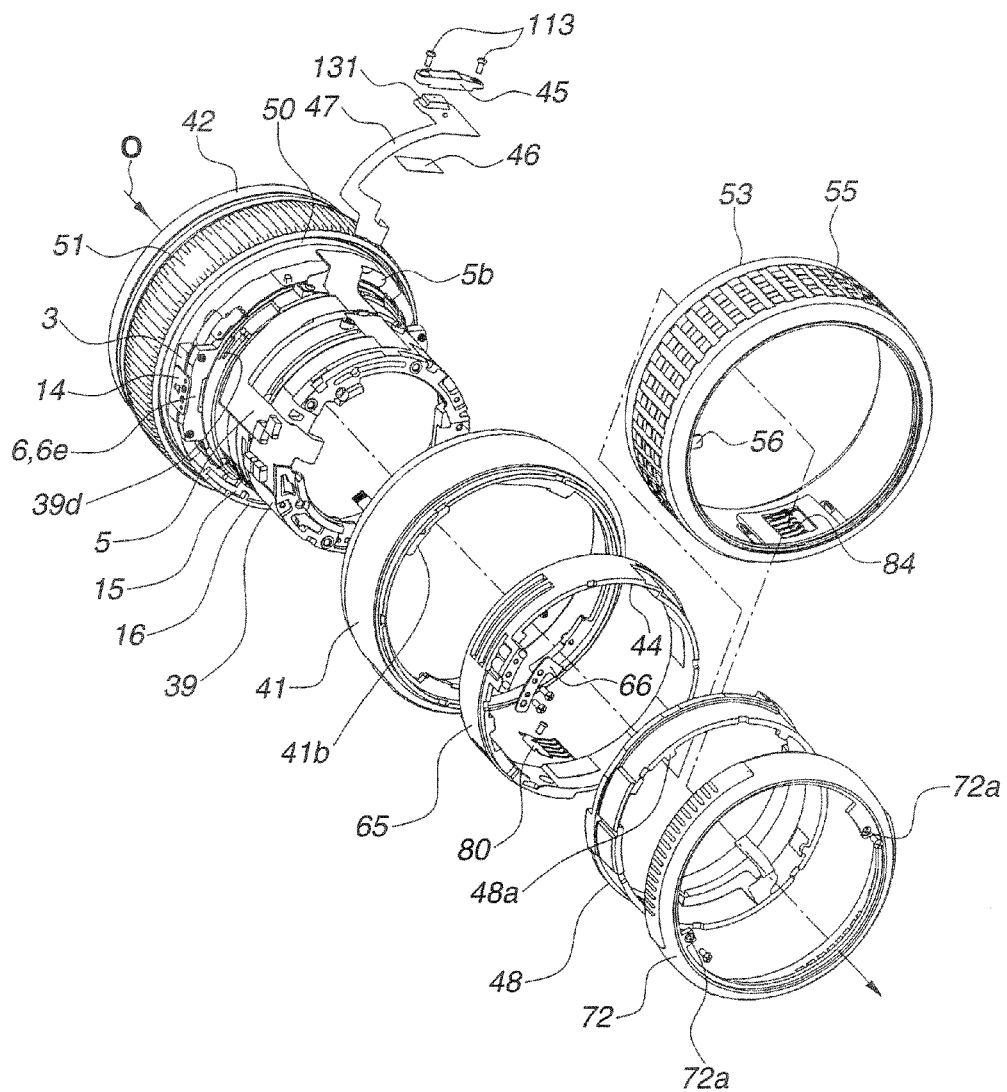
FIG. 21 is an exploded perspective view of a distance ring, an ultrasound motor unit, a middle cover, a zoom ring, a zoom base and a rear cover of the lens barrel in FIG. 3, viewed from the rear side of an optical axis.
Figure 22:
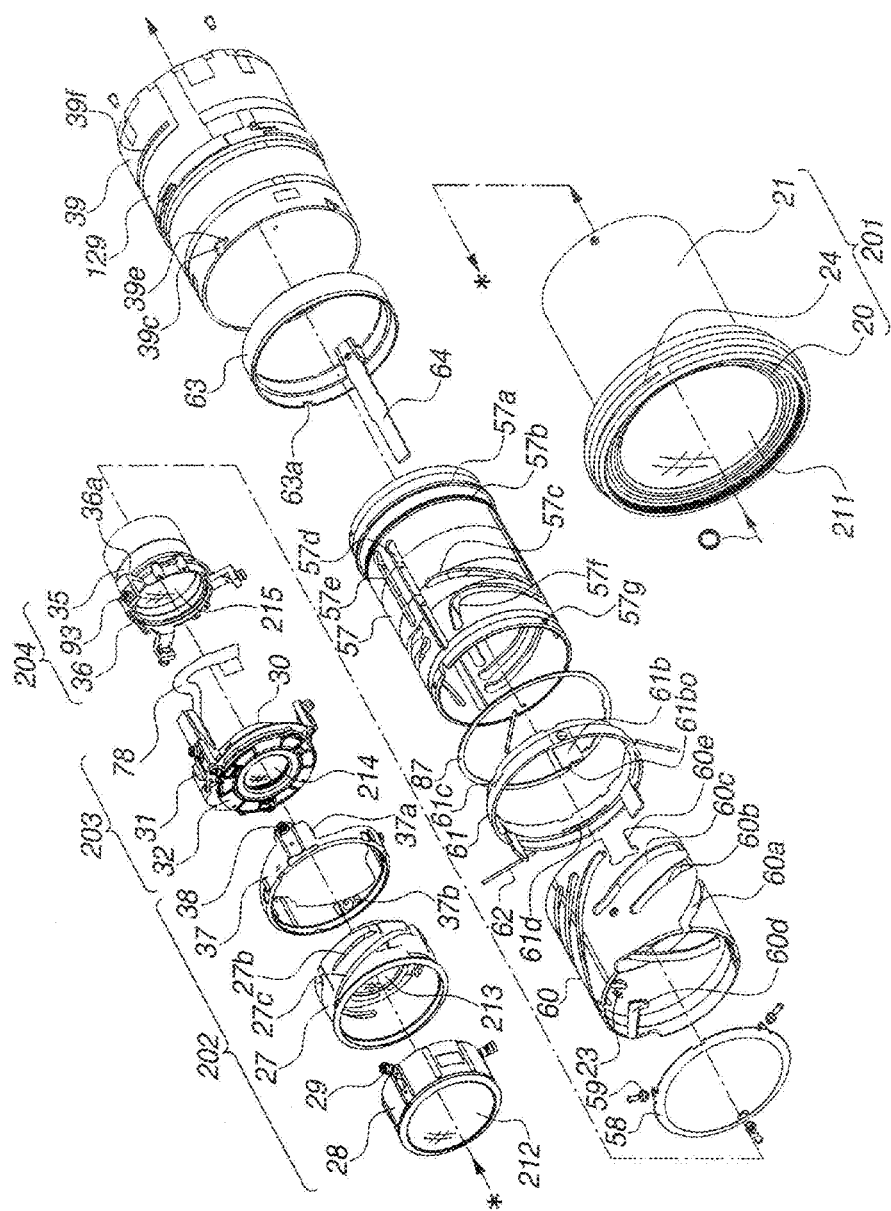
FIG. 22 is an exploded perspective view of 1Z to 4Z units, a cam ring, a fixed frame and a main frame of the lens barrel in FIG. 3, viewed from the front side of an optical axis.
Figure 23:
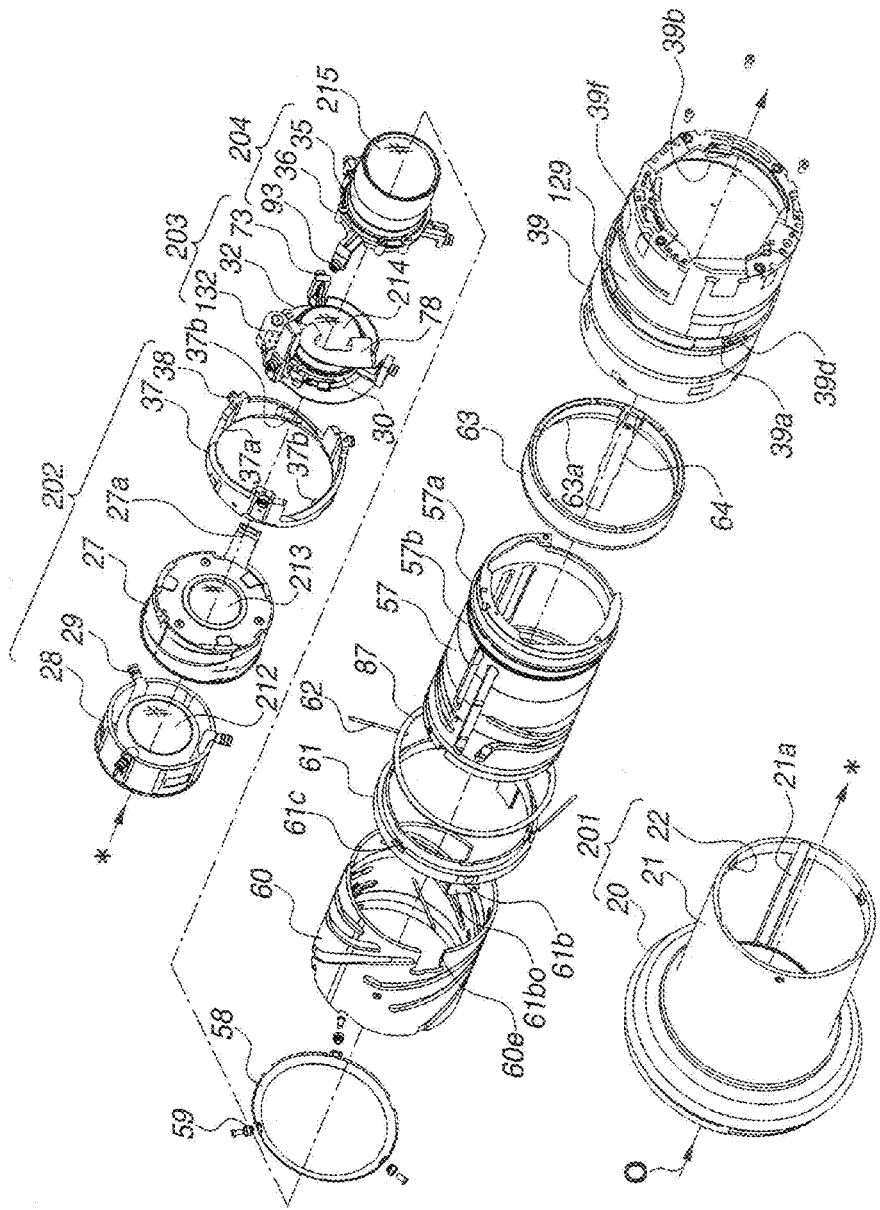
FIG. 23 is an exploded perspective view of 1Z to 4Z units, a cam ring, a fixed frame and a main frame of the lens barrel in FIG. 3, viewed from the rear side of an optical axis.
Figure 24:
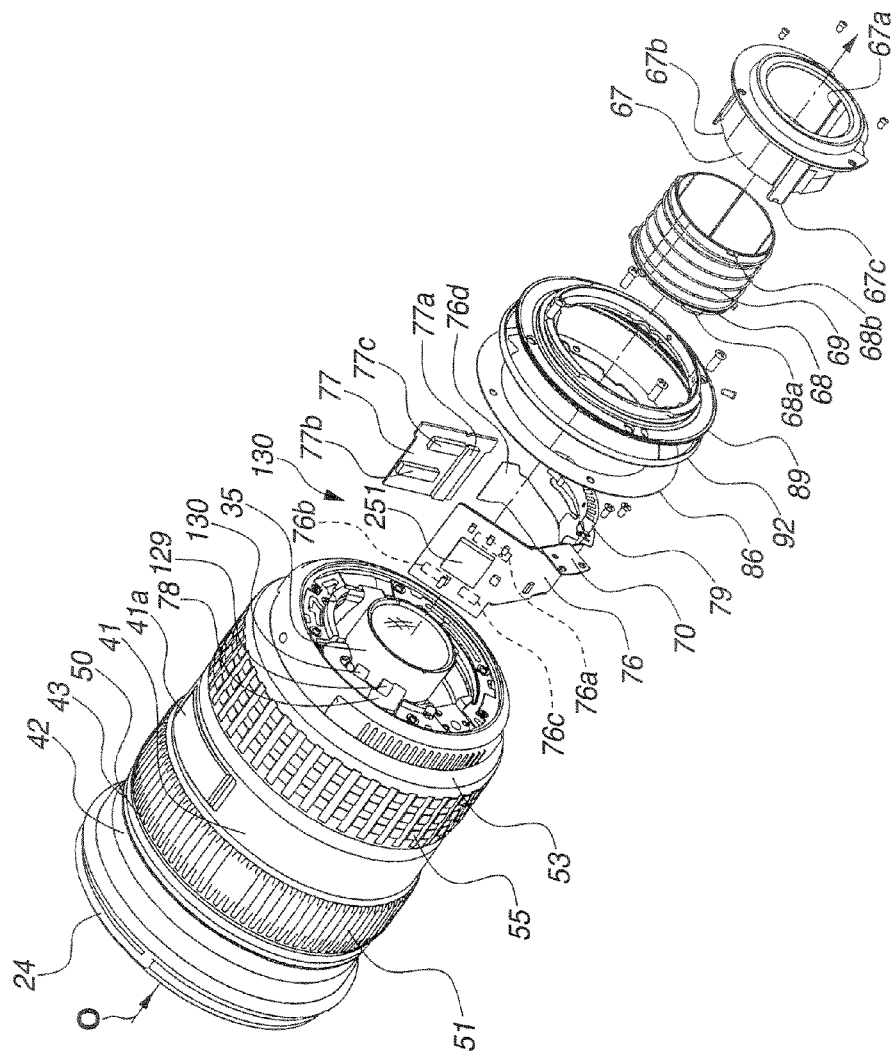
FIG. 24 is an exploded perspective view of a lens barrel exterior portion, cover rings and a lens mount of a lens barrel in FIG. 3, viewed from the rear side of an optical axis.

FIG. 13 to 24 are exploded perspective views of constituting members and units in the lens barrel: FIGS. 13 and 14 are exploded perspective views of members including a distance ring, a transmission mechanism and a main frame; FIG. 13 is a view from the front side of an optical axis; and FIG. 14 is a view from the rear side of an optical axis; FIG. 15 is an exploded perspective view of an ultrasound motor unit; FIGS. 16 and 17 are perspective views of an ultrasound motor unit; FIG. 16 is a view from the front side of an optical axis; and FIG. 17 is a view from the rear side of an optical axis. FIG. 18 is a view taken in the direction of arrow J in FIG. 17. FIG. 19 is a view taken in the direction of arrow K in FIG. 17. FIGS. 20 and 21 are exploded perspective views of a distance ring, an ultrasound motor unit, a middle cover, a zoom ring, a zoom base and a rear cover; FIG. 20 is a view from the front side of an optical axis; and FIG. 21 is a view from the rear side of an optical axis. FIGS. 22 and 23 are exploded perspective views of members including 1Z to 4Z units, a cam ring, a fixed frame, and a main frame; FIG. 22 is a view from the front side of an optical axis; and FIG. 23 is a view from the rear side of an optical axis. FIG. 24 is an exploded perspective view of members including a lens barrel exterior portion, cover rings and a lens mount.

Figure 25:
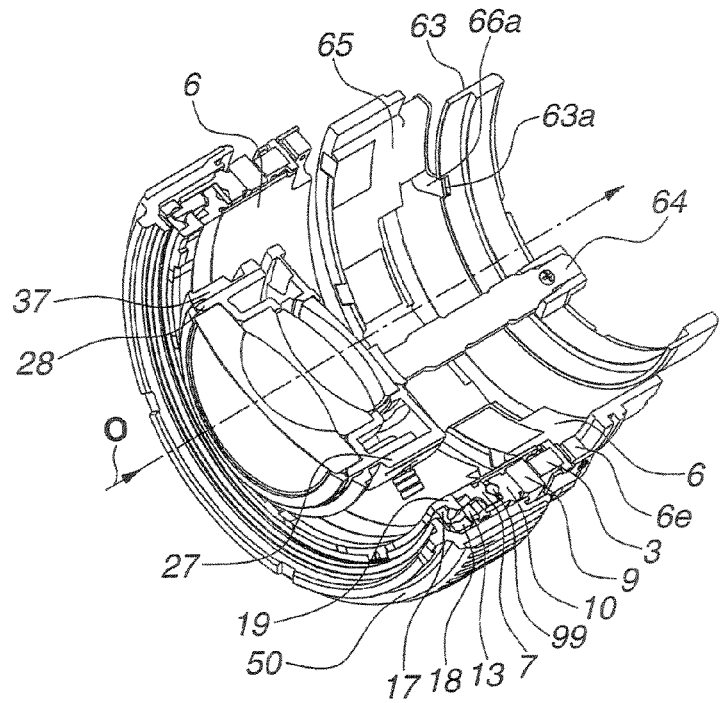
FIG. 25 is a cutaway perspective view of an ultrasound motor unit, inner and outer interlock rings and a 2Z frame of the lens barrel in FIG. 3, viewed from the front side of an optical axis.
Figure 26:
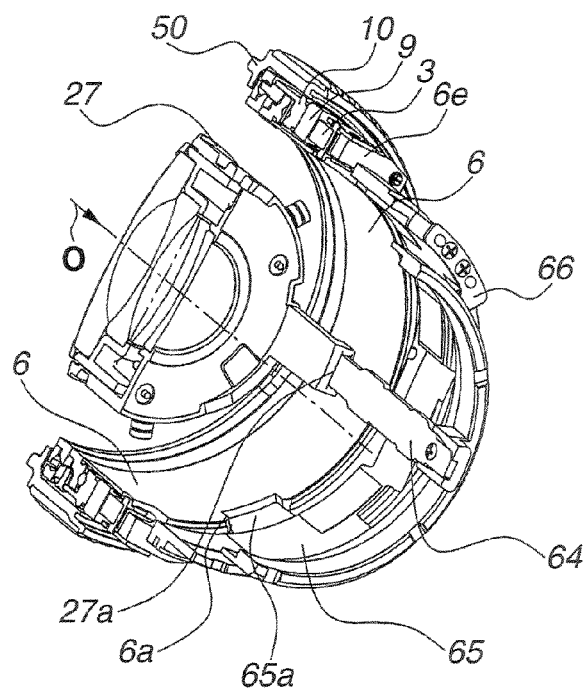
FIG. 26 is a cutaway perspective view of an ultrasound motor unit, inner and outer interlock rings and a 2Z frame of the lens barrel in FIG. 3, viewed from the rear side of an optical axis.
Figure 27:
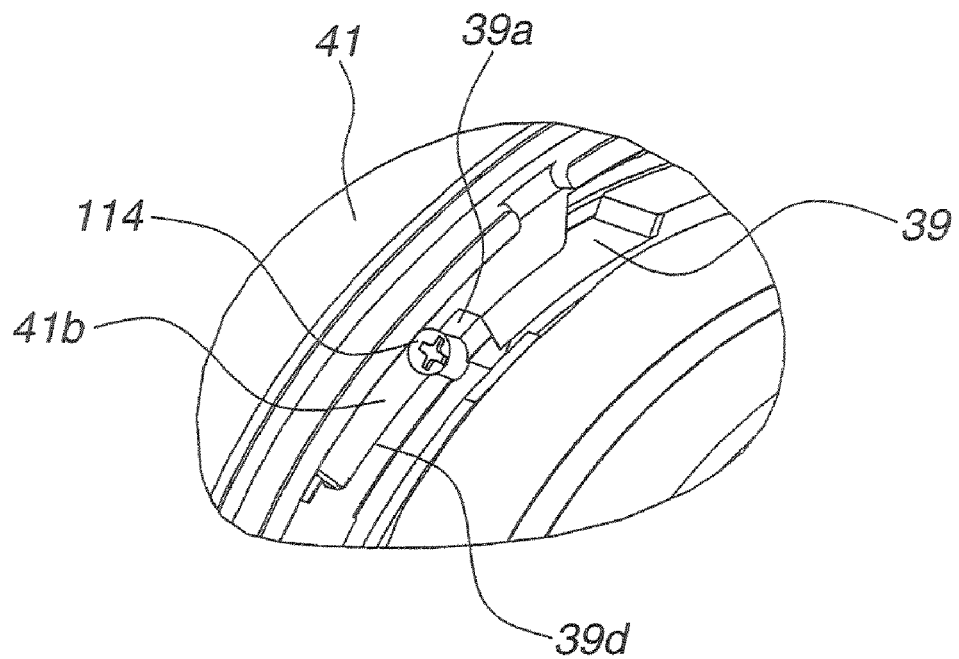
FIG. 27 is a perspective view of a portion of the lens barrel in FIG. 3, which secures a middle cover to a main frame.
Figure 28:
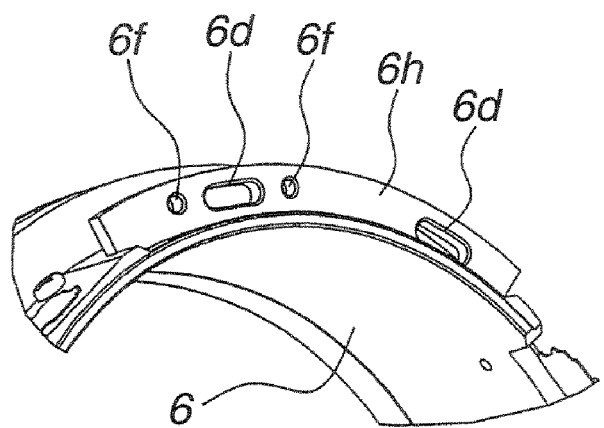
FIG. 28 is a perspective view of a scale base plate-mounting portion of an LD frame of the lens barrel in FIG. 3.
Figure 29:
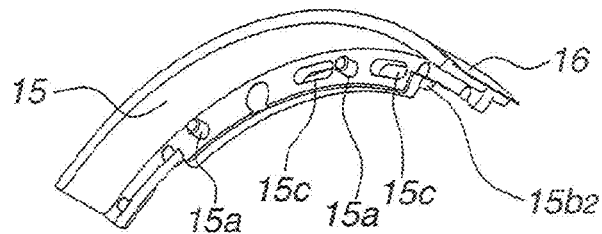
FIG. 29 is a perspective view of a scale base plate of the lens barrel in FIG. 3.
Figure 30:
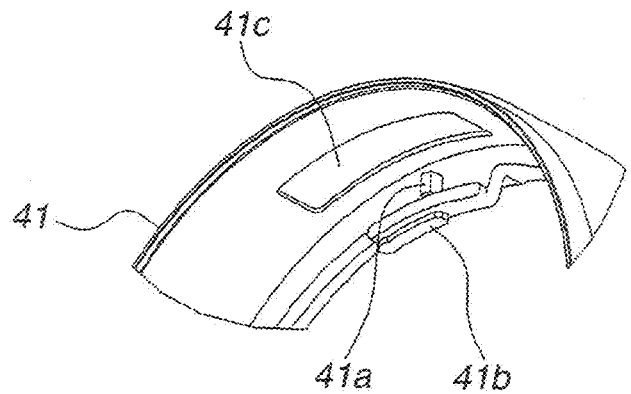
FIG. 30 is a perspective view of a portion around a scale window of a middle cover of the lens barrel in FIG. 3.
Figure 31:
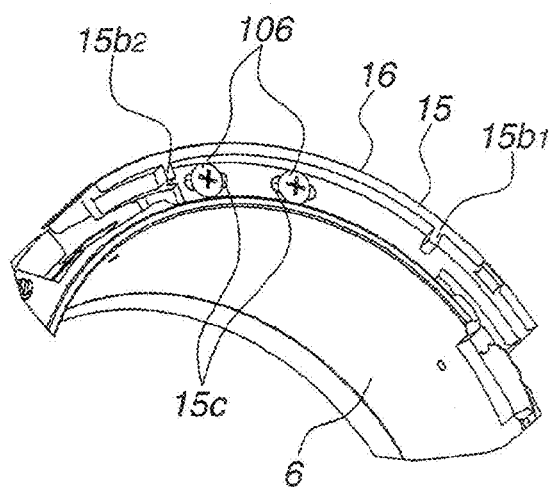
FIG. 31 is a perspective view illustrating a state in which a scale base plate is attached to an LD frame in the lens barrel in FIG. 3.
Figure 32:
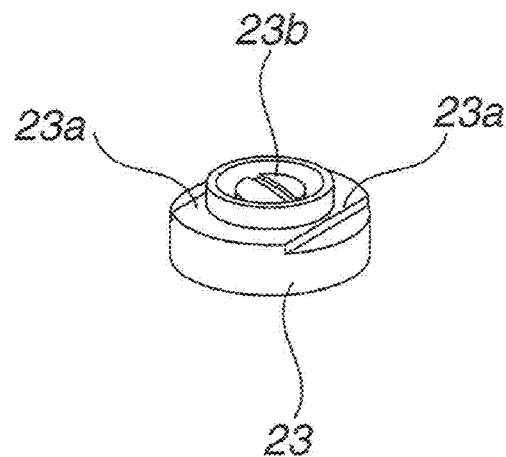
FIG. 32 is a perspective view of a cam follower to be attached to a cam frame in the lens barrel in FIG. 3.
Figure 33:
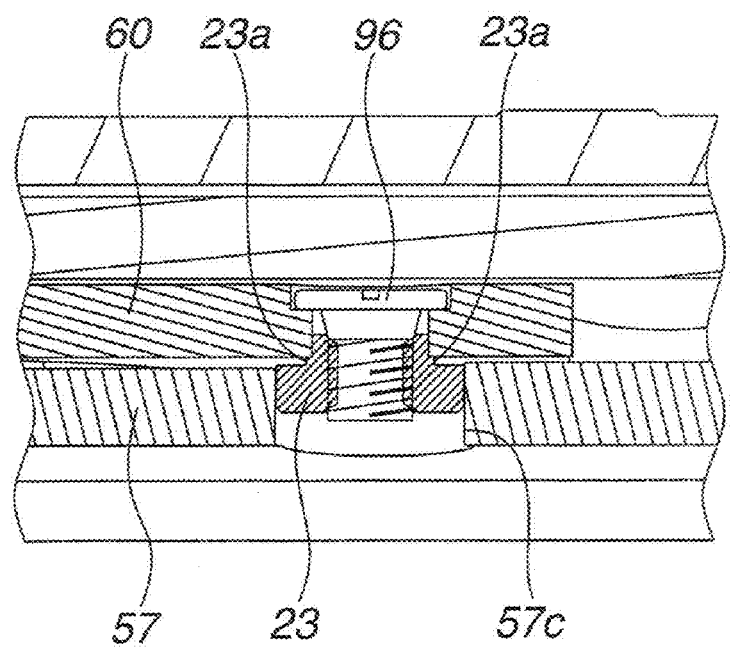
FIG. 33 is a cross-sectional view illustrating a state in which the cam follower in FIG. 32 is attached to the cam frame.
Figure 34:
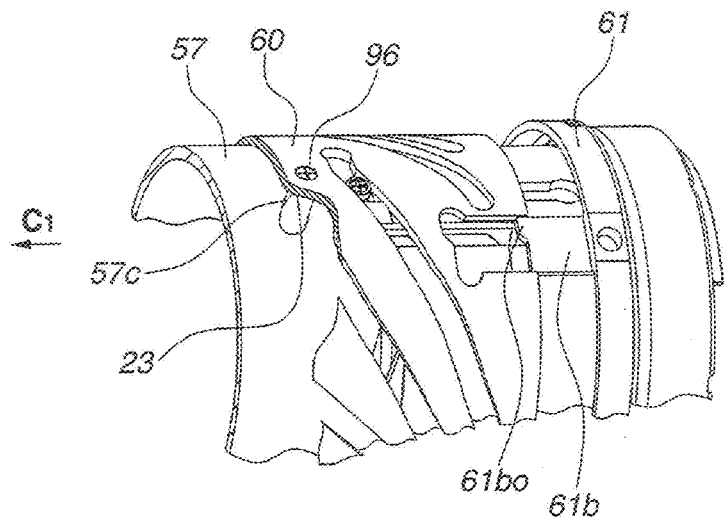
FIG. 34 is a perspective view illustrating a state in which a cam driving ring and a cam frame are attached to a fixed frame in the lens barrel in FIG. 3.
Figure 35:
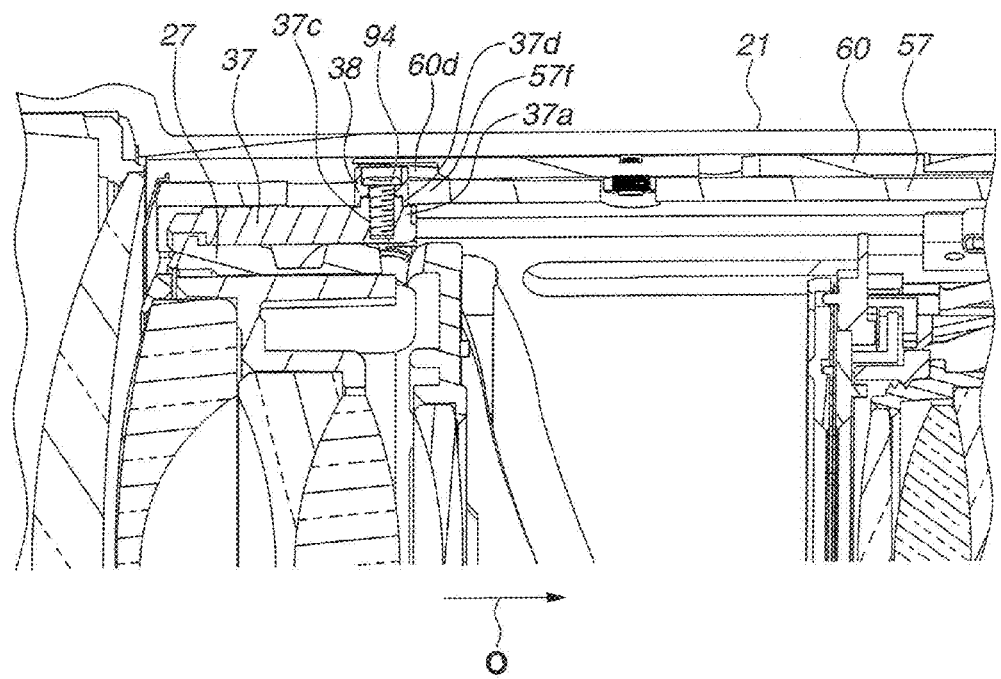
FIG. 35 is a cross-sectional view illustrating a state in which a cam follower attached to a 2Z frame engages with a fixed frame and a cam frame in the lens barrel in FIG. 3.

FIG. 25 to 35 are perspective views or cross-sectional views for describing an assembled state of the respective constituting members: FIGS. 25 and 26 are cutaway perspective views of an ultrasound motor unit, inner and outer interlock rings and a 2Z frame, FIG. 25 being a view from the front side of an optical axis, FIG. 26 being a view from the rear side of an optical axis; FIG. 27 is a perspective view of a portion that secures a middle cover to a main frame; FIG. 28 is a perspective view of a scale base plate-mounting portion of an LD frame; FIG. 29 is a perspective view of a scale base plate; FIG. 30 is a perspective view of a portion around a scale window of a middle cover; FIG. 31 is a perspective view illustrating a state in which a scale base plate is attached to an LD frame; FIG. 32 is an enlarged perspective view of a cam follower to be attached to a cam frame; FIG. 33 is an enlarged cross-sectional view illustrating a state in which the cam follower in FIG. 32 is attached to a cam frame; FIG. 34 is a perspective view illustrating a state in which a cam driving ring and a cam frame are attached to a fixed frame; and FIG. 35 is a cross-sectional view illustrating a state in which a cam follower attached to a 2Z frame engages with a fixed frame and a cam frame.

Figure 36:
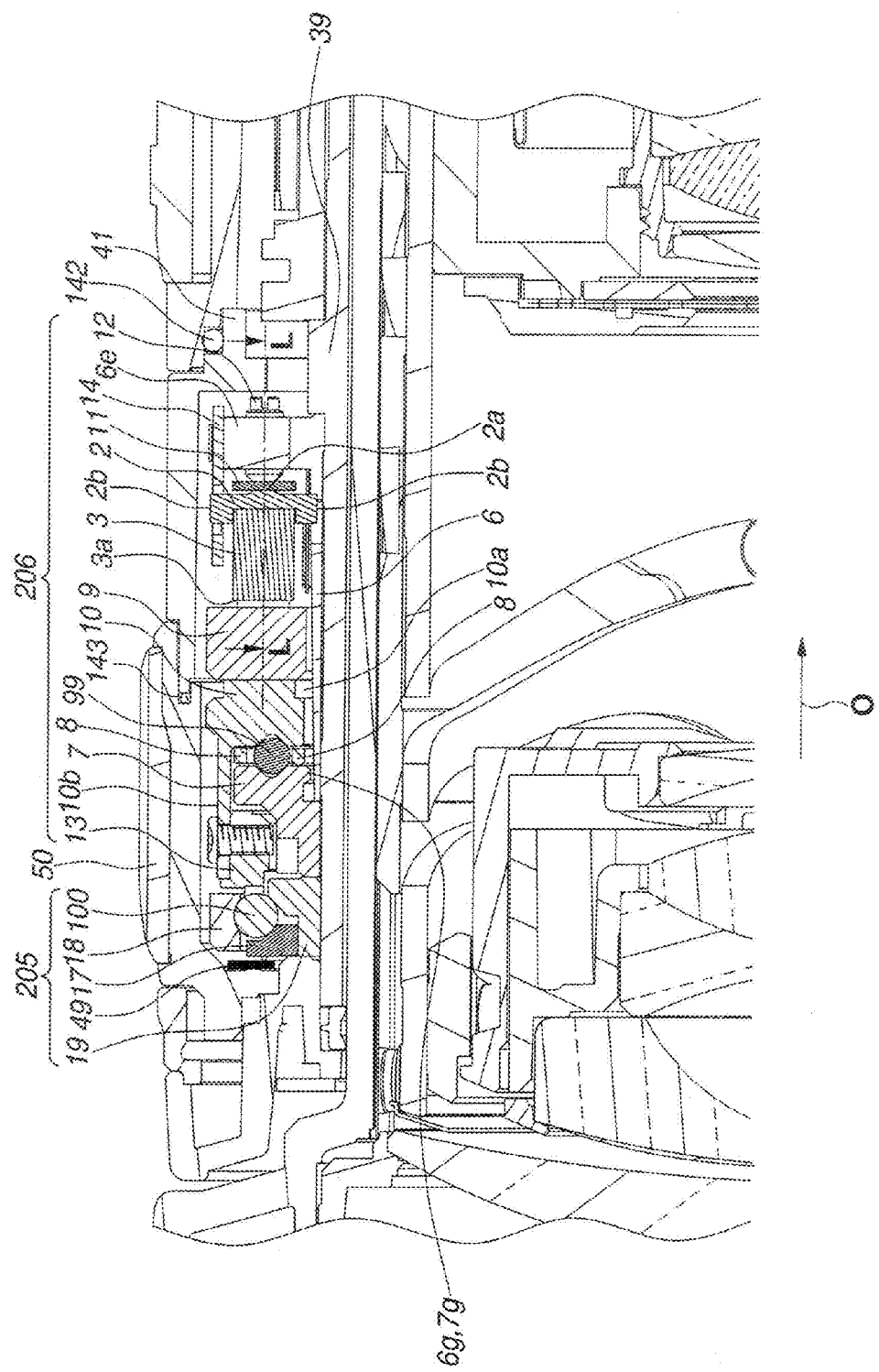
FIG. 36 is a cross-sectional view of a portion around an ultrasound motor unit including a transmission mechanism and a transducer of the lens barrel in FIG. 3 along an optical axis.
Figure 37:
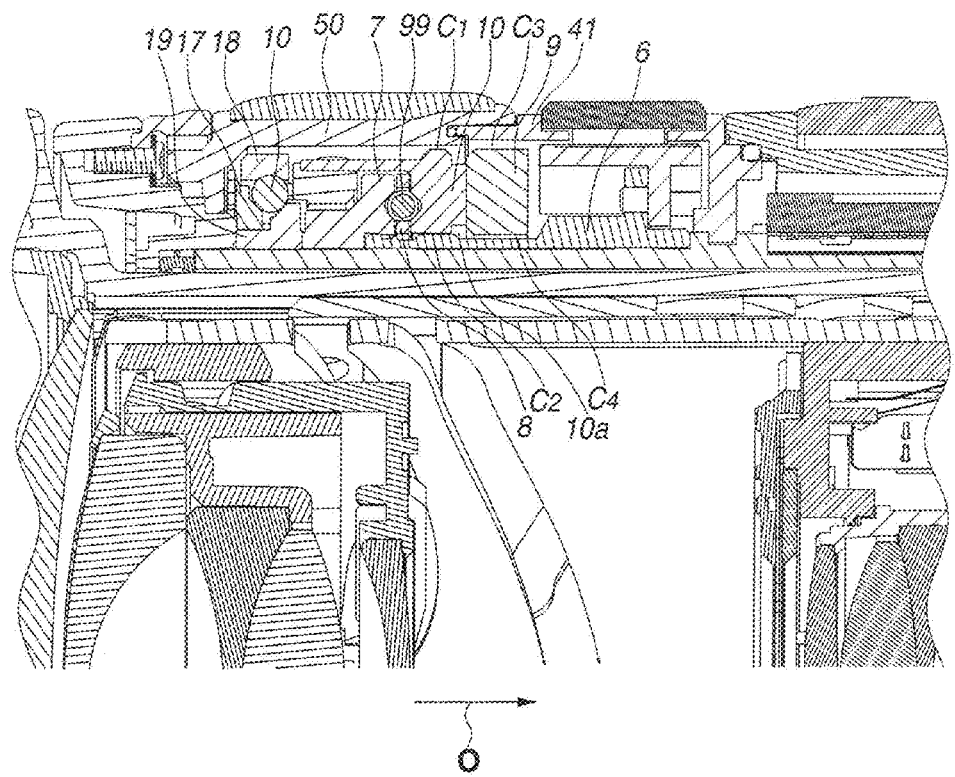
FIG. 37 is a cross-sectional view of a portion around a transmission mechanism and an ultrasound motor unit of the lens barrel in FIG. 3 along an optical axis.
Figure 38:
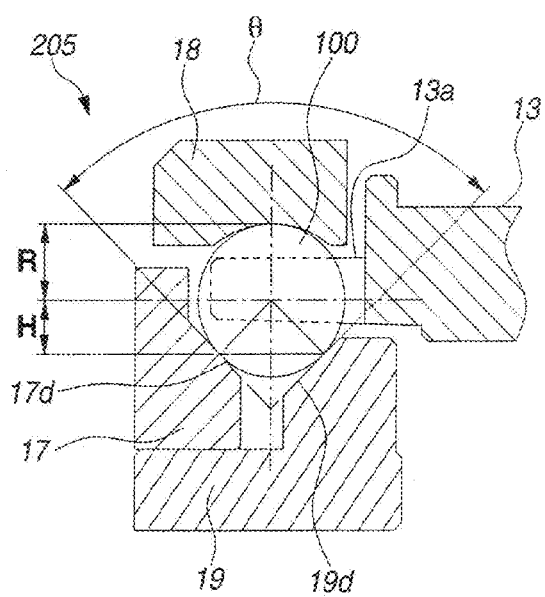
FIG. 38 is an enlarged cross-sectional view of a portion around a transmission section of a transmission mechanism in the lens barrel in FIG. 3.
Figure 39:
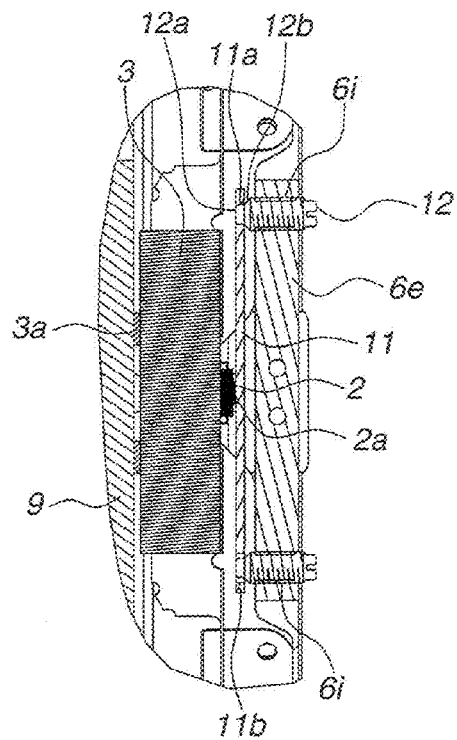
FIG. 39 is a cross-sectional view taken along L-L of FIG. 36, which shows a manner in which a transducer is incorporated in an ultrasound motor unit.
Figure 40:
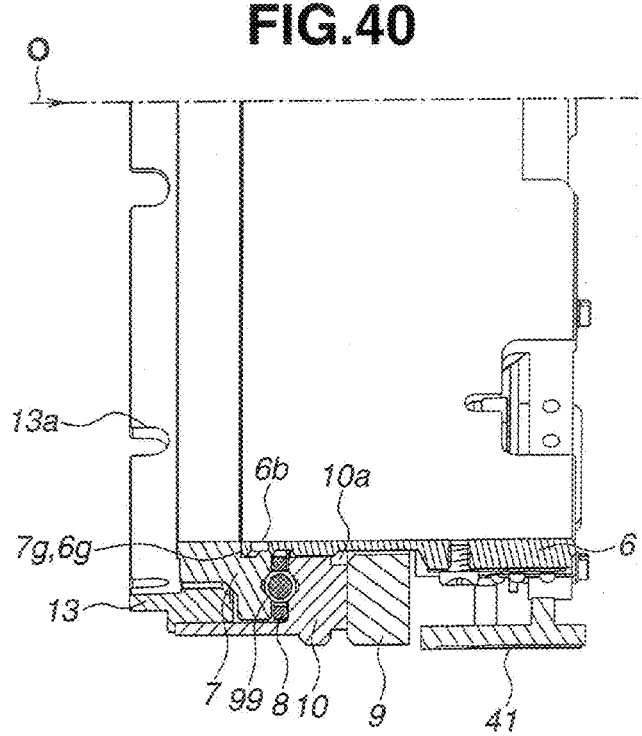
FIG. 40 is a cross-sectional view of a portion around a portion of thread connection between an LD frame and an LD ball presser of an ultrasound motor unit in the lens barrel in FIG. 3.
Figure 41:
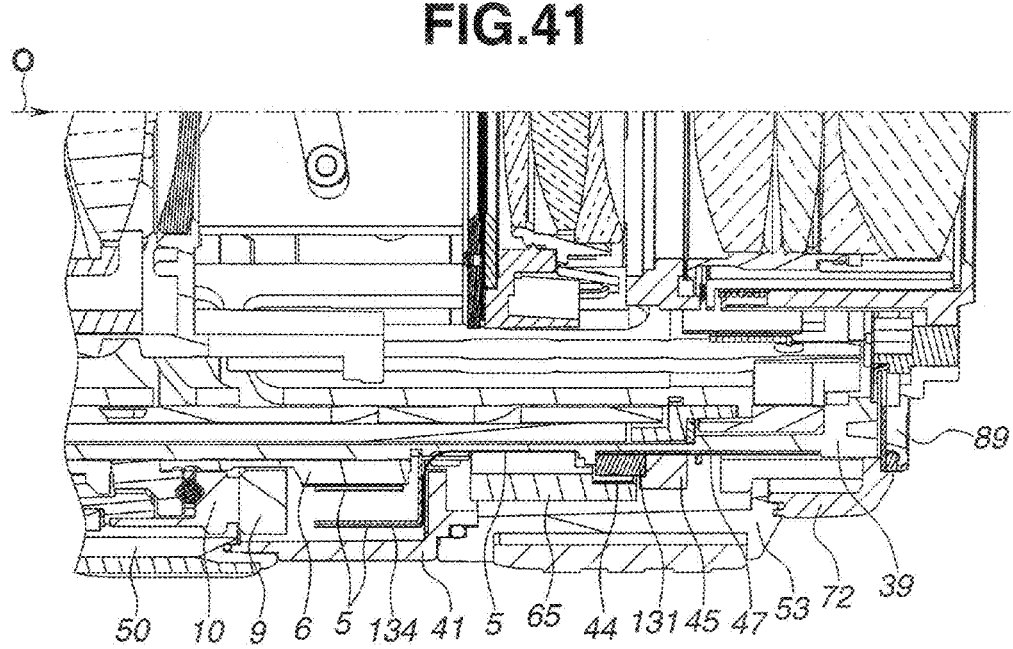
FIG. 41 is a cross-sectional view illustrating an arrangement of a motor FPC and an outer interlock ring rotation detection SMD sensor (optical sensor head) of an ultrasound motor unit in the lens barrel in FIG. 3.
Figure 42:
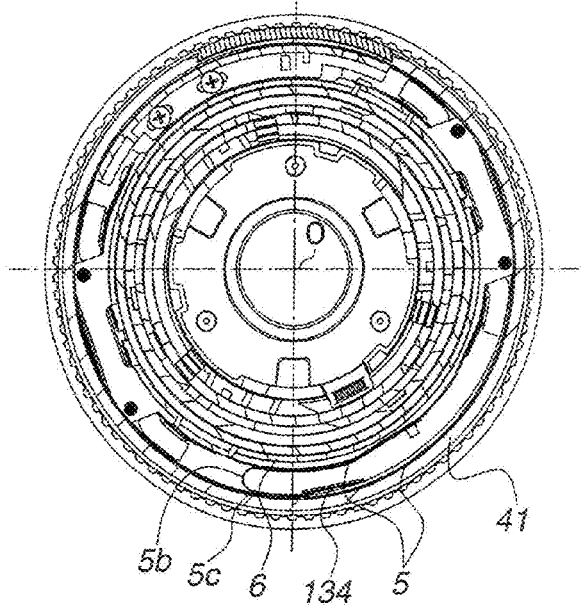
FIG. 42 is a cross-sectional view illustrating a state of flexure of a flexible portion of a motor FPC in the lens barrel in FIG. 3, in an infinity focusing state.
Figure 43:
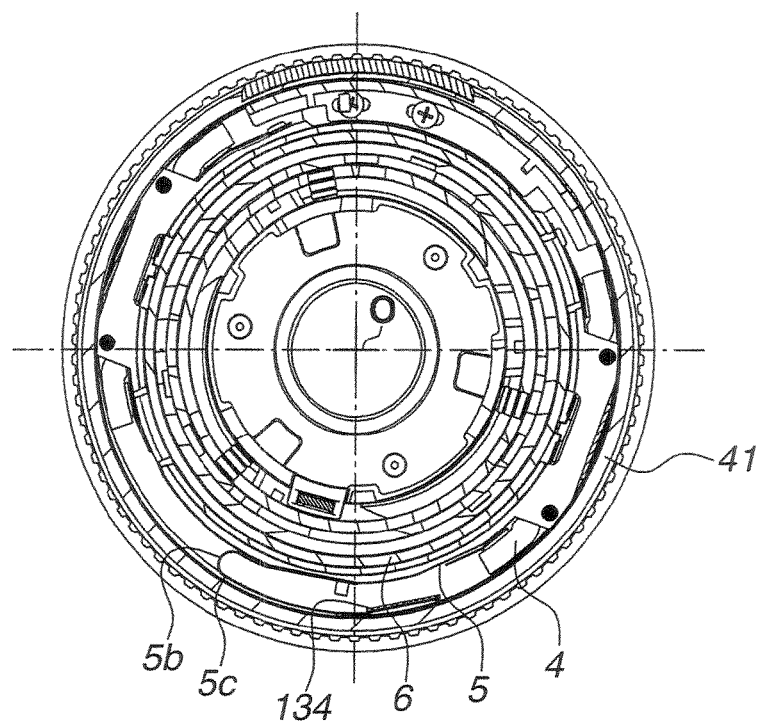
FIG. 43 is a cross-sectional view illustrating a state of flexure of a flexible portion of a motor FPC in the lens barrel in FIG. 3, in a close distance focusing state.
Figure 44:
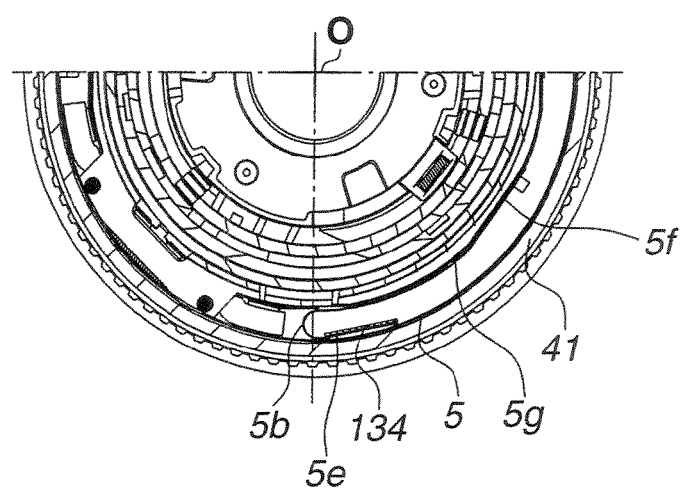
FIG. 44 is a cross-sectional view illustrating a state of flexure of a flexible portion of a motor FPC in the lens barrel in FIG. 3 in a state in which an outer interlock ring is over-rotated.

FIGS. 36 to 44 are cross-sectional views for illustrating the details of a transmission mechanism and an ultrasound motor unit: FIG. 36 is a cross-sectional view of a portion around an ultrasound motor unit including a transmission mechanism and a transducer, along an optical axis; FIG. 37 is a cross-sectional view along an optical axis of a portion around a transmission mechanism and an ultrasound motor unit; FIG. 38 is an enlarged cross-sectional view of a portion around a transmission section of the transmission mechanism; FIG. 39 is a cross-sectional view taken along L-L of FIG. 36, which shows a manner in which a transducer is incorporated in an ultrasound motor unit; FIG. 40 is a cross-sectional view of a portion around a portion of thread connection between an LD frame and an LD ball presser of an ultrasound motor unit; and FIG. 41 is a cross-sectional view illustrating an arrangement of a motor connection FPC and an outer interlock ring rotation detection SMD sensor (optical sensor head) of an ultrasound motor unit. FIGS. 42 to 44 are cross-sectional views illustrating a state of flexure of a flexible portion of the motor FPC: FIG. 42 shows a state in infinite focusing; FIG. 43 shows a state in close distance focusing; and FIG. 44 shows a state in which an outer interlock ring is over-rotated.

Figure 45A:
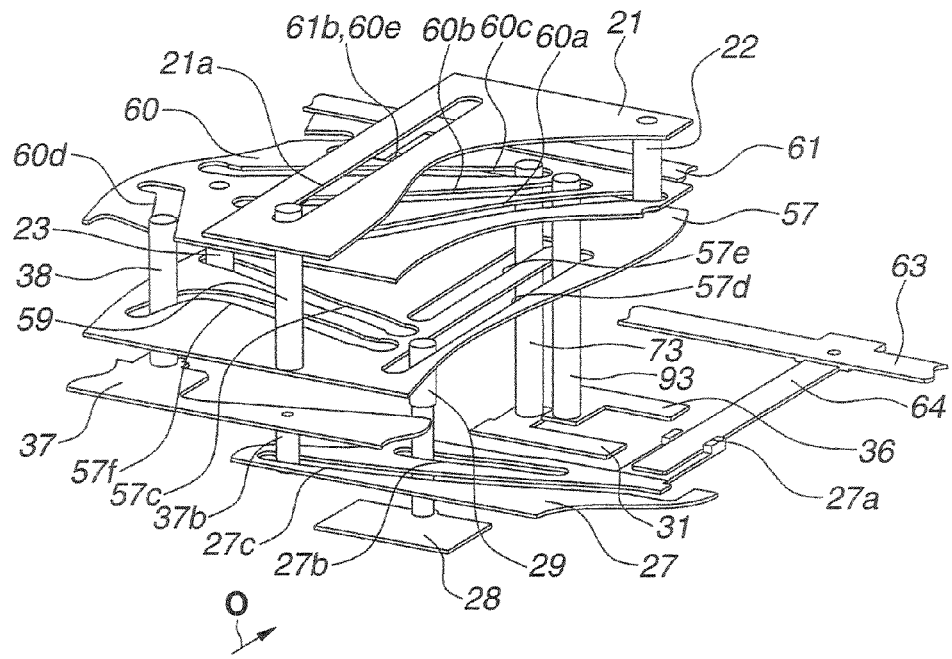
FIGS. 45A and 45B are schematic perspective views illustrating movement of respective frame members in a wide-angle state, in accordance with rotation of a cam frame and an inner interlock ring in the lens barrel in FIG. 3.
Figure 45B:
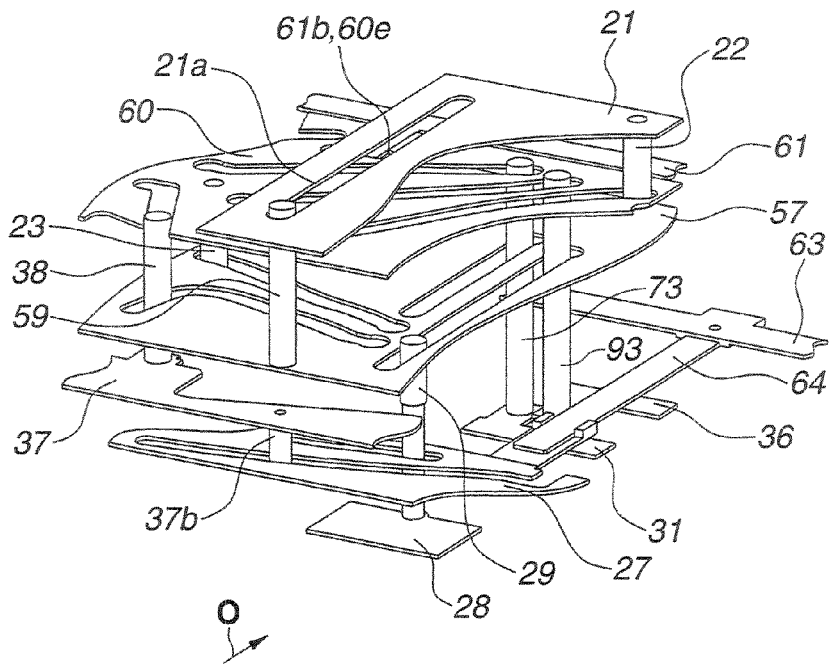
Figure 46A:
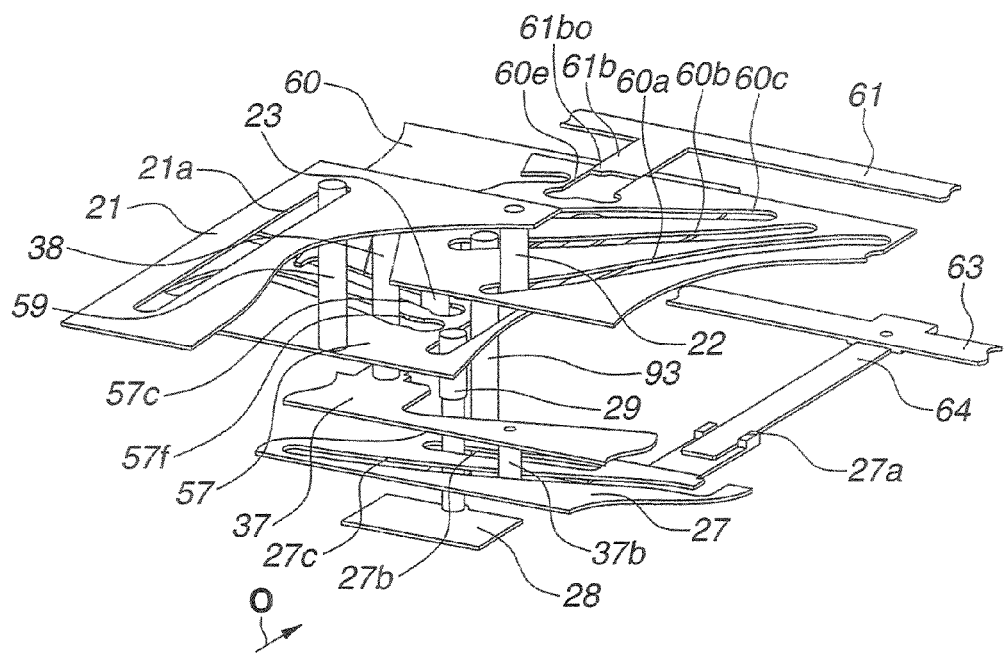
FIGS. 46A and 46B are schematic perspective views illustrating movement of respective frame members in a telephoto state, in accordance with rotation of a cam frame and an inner interlock ring in the lens barrel in FIG. 3.
Figure 46B:
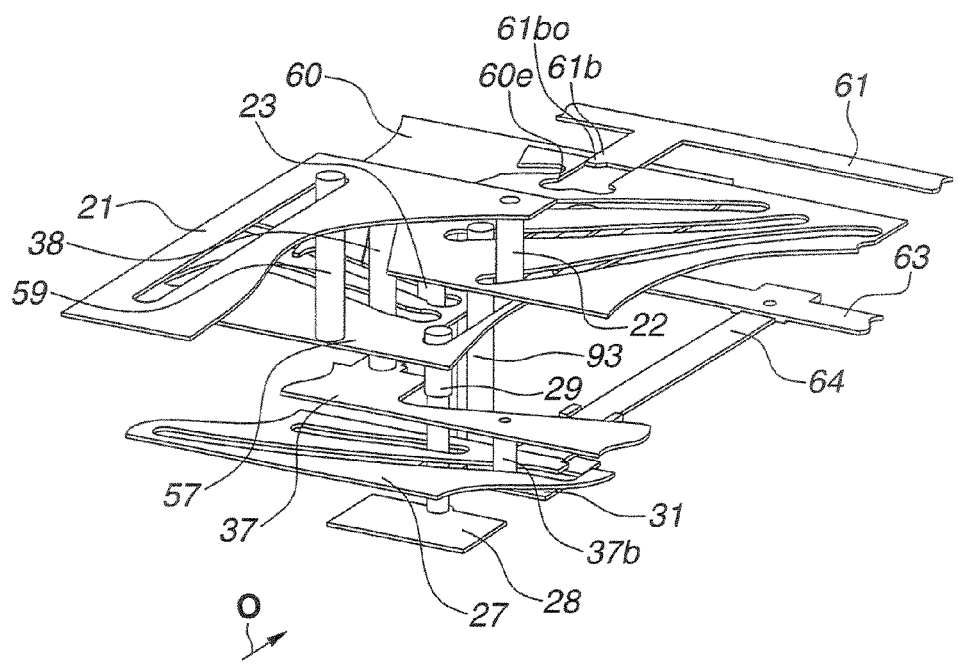
Figure 47A:
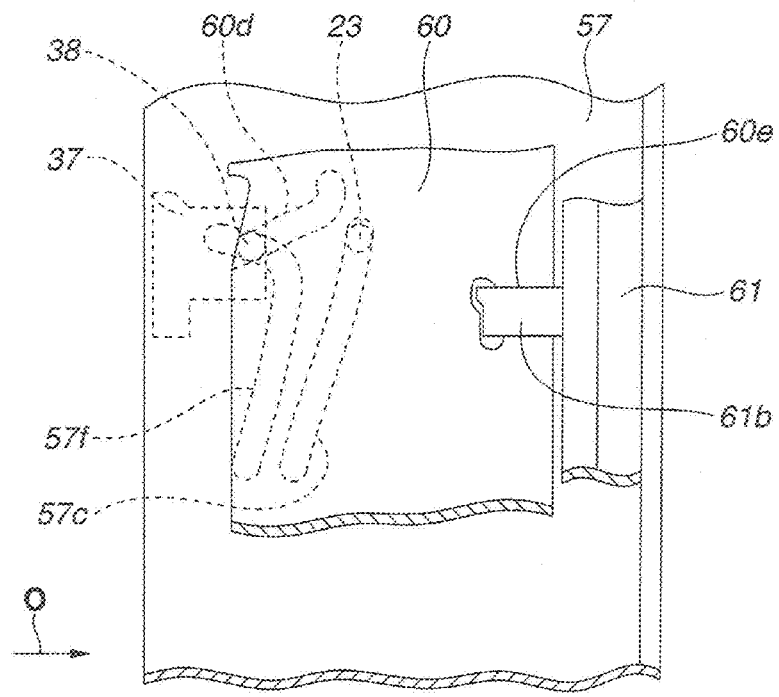
FIGS. 47A and 47B are development views illustrating movement of a 2Z frame in accordance with rotation of a cam frame in the lens barrel in FIG. 3.
Figure 47B:
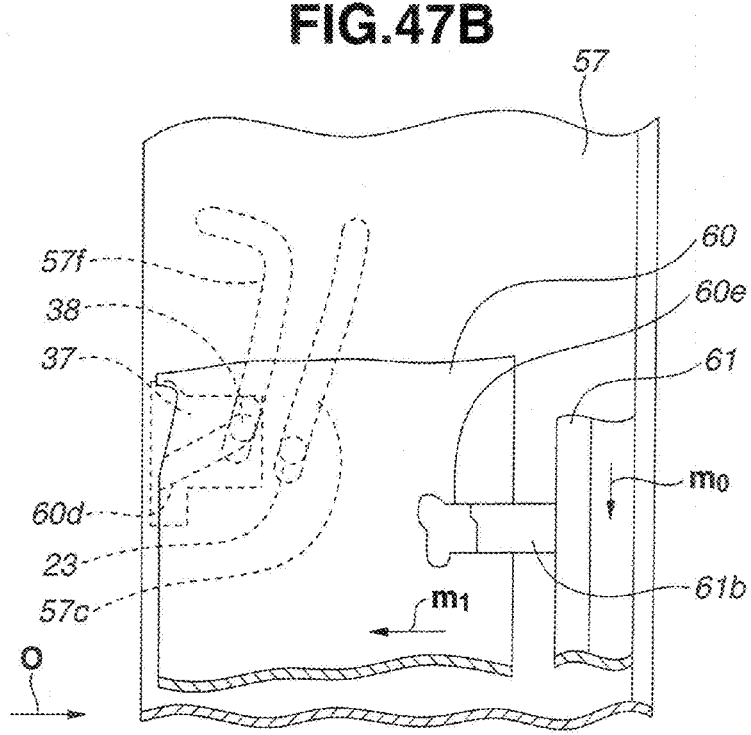
Figure 48:
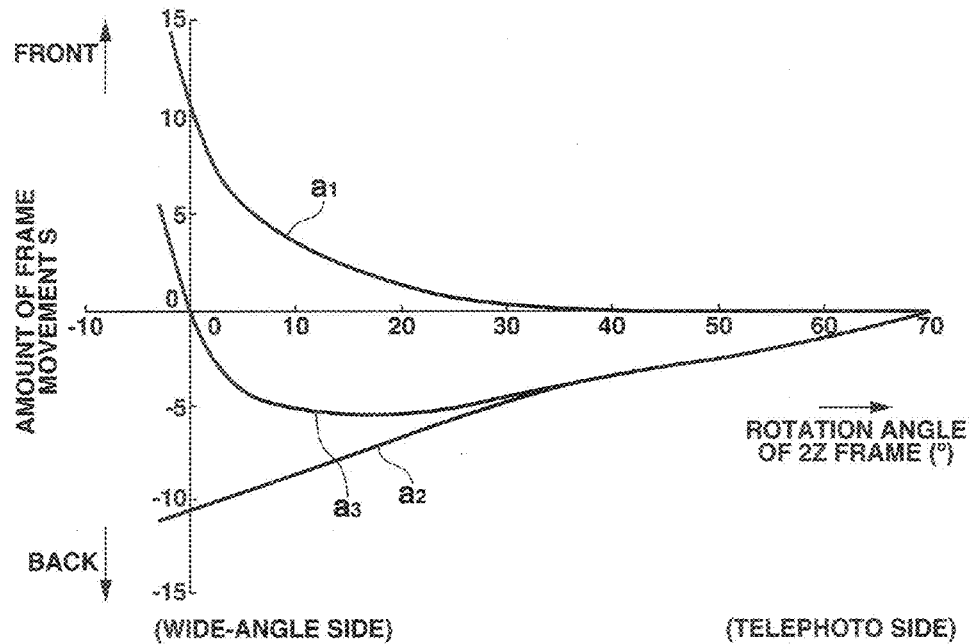
FIG. 48 is a chart illustrating variation of movement amounts of a cam frame and a 2Z frame relative to a rotation angle of the 2Z frame in the lens barrel in FIG. 3.
Figure 49:
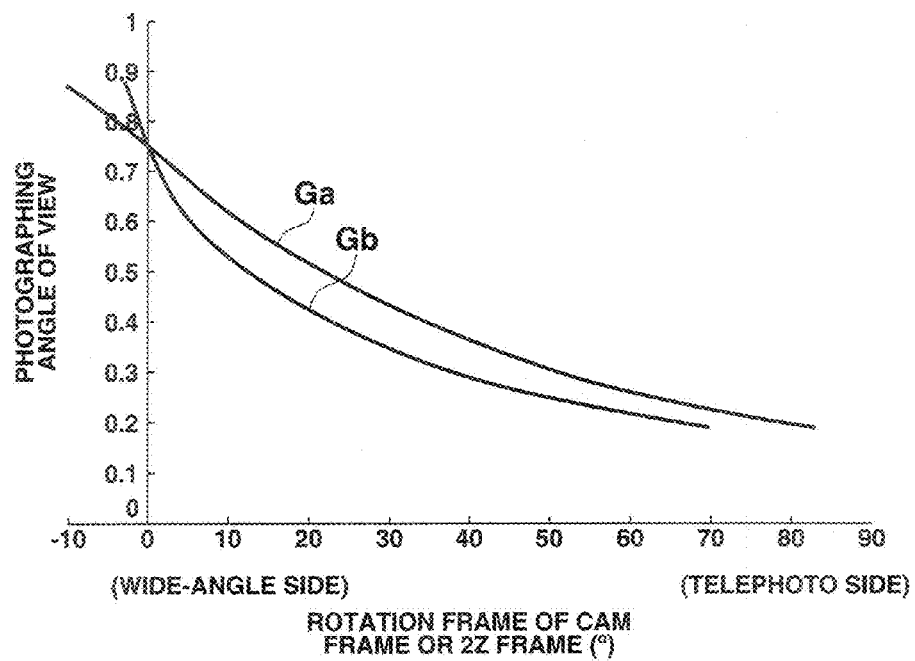
FIG. 49 is a chart illustrating variation of a photographing angle of view relative to a rotation angle of a cam frame or a 2Z frame in the lens barrel in FIG. 3.
Figure 50:
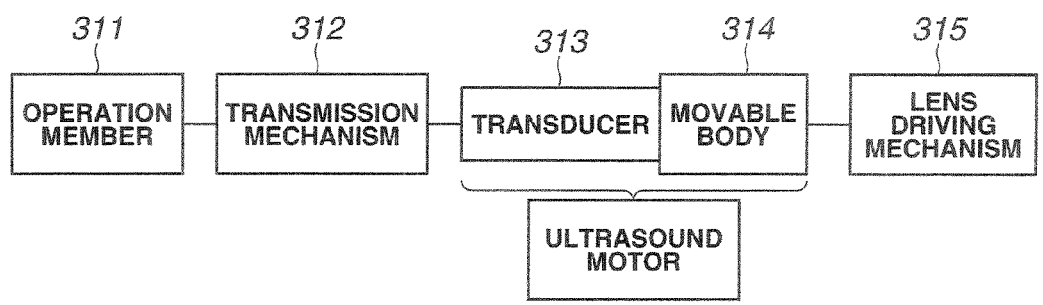
FIG. 50 is a block diagram of a configuration of a conventional lens barrel.
Figure 51:
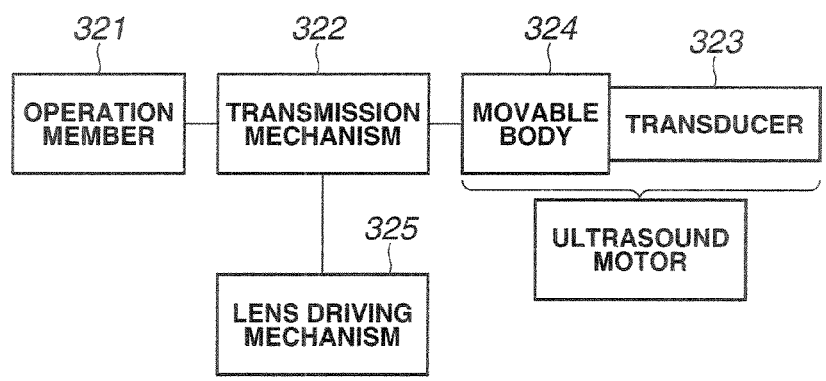
FIG. 51 is a block diagram of a configuration of another conventional lens barrel.

FIGS. 45A to 49 are views for describing advancement/ withdrawal of a cam frame and other frame members in zooming or focusing: FIGS. 45A, 45B, 46A and 46B are schematic perspective views illustrating movement of respective frame members, in accordance with rotation of a cam frame and an inner interlock ring, FIG. 45A showing a wide-angle and infinity focusing state, FIG. 45B showing a wide-angle and close distance focusing state, FIG. 46A showing a telephoto and infinity focusing state, and FIG. 46B showing a telephoto and close distance focusing state; FIGS. 47A and 47B are development views illustrating movement of a 2Z frame in accordance with rotation of the cam frame, FIG. 47A showing a wide-angle state, and FIG. 47B showing a telephoto state; FIG. 48 is a chart illustrating variation of movement amounts of a cam frame and a 2Z frame relative to a rotation angle of the 2Z frame; and FIG. 49 is a chart illustrating variation of a photographing angle of view relative to a rotation angle of a cam frame or a 2Z frame.

The optical axis of the taking lens of the lens barrel (hereinafter referred to as "optical axis") is indicated by "O" in the figures, and in the following description, the side of the optical axis close to the subject is the front side, and the image-forming side is the rear side. Also, the rotation directions of the respective frame members are rotation directions viewed from the front side.

The lens barrel 1 according to the present embodiment, as shown in FIG. 3, etc., includes: a main frame 39 and a fixed frame 57 integrally coupled to the main frame, as fixed members; a front cover 42, a middle cover 41, a zoom base 48 and a rear cover 72, as exterior frame members secured to and supported by the outer circumference of the main frame 39; a distance ring 50 and a zoom ring 53 as operation members that can rotate relative to the outer circumference of the main frame 39; the transmission mechanism 205; the ultrasound motor unit 206 including an LD frame 6, which is a frame member; a cam frame 60 that is fitted on the outer circumference of the fixed frame 57 in a rotatable manner; a 1Z unit 201 inserted between the main frame 39 and the cam frame 60; a 2Z unit 202 and a 3ZS unit 203 as units inserted into an inner portion of the fixed frame 57; a 4Z unit 204; a first lens group, second front/rear lens groups, a third lens group and a fourth lens group 211 to 215 as optical systems held by the respective units; and cover rings, a main board and a lens mount 89 provided at the rear end of the main frame 39, etc.

First, the fixed frame members and the exterior frame members will be described.

The main frame 39 as a fixed member, as shown in FIGS. 13 and 22, etc., is a cylindrical frame member, and is provided with key slots 39c extending in the optical axis direction, the key slots 39c being provided at front positions in its outer circumference, circumferential locking slots 39e connected to the slots, locking slots 39d provided at the outer circumference, rotation stopping protrusions 39a provided in the vicinity of the slots, and drive piece insertion slots 39b and 39f circumferentially provided (FIG. 14).

A distance encoder 129 including an FPC in which an encoder pattern for detecting the absolute rotation position of an LD frame 6 is formed is attached to the outer circumference of the main frame 39. Furthermore, an SMD sensor 131 including an optical sensor head for detecting the rotation amount of the LD frame 6 (or an outer interlock ring 65) (which will be detailed later) is fixed to the outer circumference of the main frame 39 by a sensor presser 45 using screws 113 in a state in which the SMD sensor 131 is mounted on an FPC 47 for an SMD. Also, the FPC 47 for an SMD is attached to the outer circumference of the main frame 39 (FIG. 21).

The fixed frame 57, as shown in FIG. 22, etc., is a cylindrical member, and is provided with a circumferential rib 57a in the rear portion of its outer circumference, a circumferential slot 57b for locking pins, which is provided in the vicinity of the rib 57a, three linear slots 57e and three linear slots 57d extending in the optical axis direction, three cam slots 57c for the cam frame and three 2Z cam slots 57f, which are inclined relative to the optical axis direction, at its cylindrical portion, and screw holes 57g at its front end.

The fixed frame 57 is inserted into the inner side of the main frame 39 and is secured by screws to the main frame 39 in a state in which the rear end of the fixed frame 57 is in contact with the main frame 39.

The middle cover 41, as shown in FIGS. 20 and 30, etc., is a cylindrical frame member, and provided with engaging protrusions 41b and stopper protrusions 41a protruding from its inner circumference, and also provided with a scale indication window 41c fixed to an opening of its outer circumference.

The middle cover 41 is inserted onto the outer circumference of the main frame 39, and as shown in FIG. 27, the engaging protrusions 41b engage with the locking slots 39d under pressure of a degree that causes no backlash. Screws 114 are fitted in the middle cover 41 to make the screw heads in contact with the rotation stopping protrusions 39a, thereby the middle cover 41 circumferentially fits on the outer circumference of the main frame 39 to secure the middle cover 41 to the outer circumference of the main frame 39. Here, "circumferentially fit" means that inner and outer circumferences of two frame members fit each other.

The distance ring 50, as shown FIGS. 3 and 14, etc., is a ring-shaped member, and is an operation ring that upon being operated to rotate, drives the LD frame 6 to rotate, via the transmission mechanism 205 and the transducers 3, to drive the front second lens group 212 and the rear second lens group 213, which form the focusing lens, to advance/withdraw.

A rubber ring 51 is attached to the outer circumference of the distance ring 50, and the inner circumference of the distance ring 50 is provided with two protrusions 50a and three protrusions 50b, and the rubber ring 51 is inserted onto the outer side of the main frame 39 and is fitted on the front end of the middle cover 41 with packing 143 provided therebetween for assembling in a state in which the distance ring 50 can rotate to any angle. For smooth rotational operation of the distance ring 50, grease is applied to the portion to which the packing 143 is attached.

The front cover 42, as shown in FIG. 13, etc., is a ring-shaped member, and provided with locking protrusions 42a that protrude from the inner circumference, and knock pin holes 42b extending in the optical axis direction are provided at the front circumferential portion.

The front cover 42 is fixed with screws, with a decorative ring 43 attached to its inside, and as will be described later, is fitted onto and attached to the outer circumference of the main frame 39 with the distance ring 50, an MF ball receiver 19 and an MF ball presser 17, etc, attached. The front end of the distance ring 50 is circumferentially fitted onto the rear end of the outer circumference of the front cover 42 to support the distance ring 50 in a rotatable manner. Rubber packing 92 is provided between the surfaces of the front cover 42 and the main frame 39 facing each other in the optical axis direction (see FIG. 14).

The zoom base 48, as shown in FIGS. 3 and 21, etc., is a cylindrical member, and the rear end of the zoom base 48 is provided with protrusions 48a that protrude from the inner circumference, and a zoom encoder 130 including an FPC is attached to the outer circumference (see FIG. 20).

The zoom base 48 is inserted onto the outer circumference of the main frame 39 from the back, and is secured to the main frame 39 with the protrusions 48a fitted in recesses at the rear end surface of the main frame 39.

The zoom ring 53, as shown in FIGS. 3 and 20, is a cylindrical member, and upon being operated to rotate, drives the cam frame 60 to rotate, thereby driving the first, front second and rear second, third and fourth lens groups 211 to 215 to advance/withdraw to the respective zoom positions in the optical axis direction.

The zoom ring 53 includes an opening in the cylindrical surface, a zoom contact point 84 is inserted into the opening, and a contact point cover 85 is fitted in the opening in a manner in which the contact point cover 85 covers the zoom contact point 84. Furthermore, a zoom drive piece 56 is fixed to the rear end of the zoom ring 53.

The zoom ring 53 is inserted to the main frame 39 from the rear side, and is fitted in and thereby attached to the rear end of the middle cover 41 with packing 142 provided therebetween, in a manner that the zoom ring 53 can rotate within a predetermined angle range. With this attachment state, the zoom contact point 84 comes into contact with the zoom encoder 130 of the zoom base 48. When the zoom ring 53 is operated to rotate, a code signal indicating a zoom position corresponding to the absolute position of the zoom contact point 84 is outputted from the zoom encoder 130.

Also, the zoom drive piece 56 is fixed to the rear end of the inner circumference of the zoom ring 53 with screws, and a front end of the zoom drive piece 56 protrudes from the inner circumference of the zoom ring 53. The zoom drive piece 56 is inserted into the drive piece insertion slot 39b of the main frame 39 to engage with a drive piece engaging slot 61c of a cam frame drive ring 61 attached to the fixed frame 57 in a rotatable manner (see FIG. 12). Rotation of the zoom ring 53 is conveyed to the cam frame drive ring 61 via the zoom drive piece 56. The rotation range of the zoom ring 53 is restricted by the circumferential length of the drive piece insertion slot 39b.

A zoom spacer 54 including a rubber sheet is wound on the outer circumference of the zoom ring 53, and the outer side of the zoom spacer 54 is covered by the zoom rubber 55 (see FIG. 20). If the zoom spacer 54 is formed of a zoom ring 53, complicated hollowing will be required, making the mold expensive. Also, if the zoom spacer 54 is formed of zoom rubber 55, the zoom spacer 54 will become excessively thick, causing difficulty in assembly. Therefore, the zoom spacer 54 formed of an inexpensive rubber sheet is used.

The rear cover 72, as shown in FIGS. 3 and 21, etc., is a ring-shaped member, and the rear end of the rear cover 72 is provided with protrusions protruding from the inner circumference, and the protrusions are provided with screw insertion holes 72a. This rear cover 72 is inserted onto the outer circumference of the main frame 39 from the back, with the zoom base 48 and the zoom ring 53 attached to the rear cover 72. Then, the front end of the rear cover 72 is fitted on the rear end of the zoom ring 53 with packing 141 interposed therebetween, and screws are inserted into the screw insertion holes 72a with the zoom base 48 pressed, to attach and thereby fix the rear cover 72 to the main frame 39.

Next, the transmission mechanism 205 provided between the distance ring and the ultrasound motor unit will be described.

The transmission mechanism 205, as shown in FIGS. 3, 13 and 36, etc., includes a differential mechanism including an MF (manual focusing) rotor 18, an MF ball receiver 19 and an MF ball presser 17, a plurality of bearing balls 100 and a distance ring spring 49. This transmission mechanism 205 conveys rotation of the distance ring 50 manually operated to an MF retainer 13 connected to the LD (lens driving) rotor 9 in the ultrasound motor unit 206, with the speed decreased, and during the ultrasound motor unit 206 being driven, the transmission mechanism 205 provides load resistance to restrict the rotation of the MF retainer 13.

The MF rotor 18 is a ring-shaped member, and is attached to the inner circumference of the distance ring 50 together with the distance ring spring 49 in the form of a plate spring, in a manner in which relative rotation is restricted. The distance ring spring 49 is a ring-shaped thin plate spring, and includes U-shaped notches 49a extending in the radial direction on the inner circumference side, and is bent to some degree in the plate thickness direction, and thus, the distance ring spring 49 works as a spring to provide a pressing force for displacement in the lens optical axis direction. Also, the MF rotor 18 has the shape of a thin ring, and is provided with slots (key slots) 18a in the outer circumference, which are slots extending in the optical axis direction. Furthermore, a circumferential slot for receiving balls, which are revolving members, is provided in the inner circumference. As described above, in a state in which the distance ring spring 49 is inserted into the distance ring 50 with the U-shaped notches 49a engaged with hub sections 50a of the distance ring 50, key sections 50b of the distance ring 50 engage with the key slots 18a to attach the MF rotor 18 to the distance ring 50 in a manner that the MF rotor 18 can rotate together with the distance ring 50 and the distance ring spring 49 (see FIG. 14).

The MF ball receiver 19 is a ring-shaped member that is circumferentially fitted on the outer circumference of the main frame 39 and thereby fixed to the main frame 39, and is provided with protruding key sections 19a at the inner circumference, and an inclined surface 19d at the outer circumference, which is a tapered surface, two U slots 19b for knock pins, the slot extending in the optical axis direction, and key sections 19c surrounding the U slots (see FIG. 13).

The MF ball presser 17 is a ring-shaped member, and is provided with a tapered, inclined surface 17d that is inclined in the direction opposite the inclined face 19d of the MF ball receiver 19 at the outer circumference, and key slots 17a extending in the optical axis direction at the inner circumference (see FIG. 13).

The transmission mechanism 205, the distance ring 50 and the front cover 42 are attached to the front portion of the outer circumference of the main frame 39. The MF ball receiver 19 is circumferentially fitted on the outer circumference of the main frame 39 from the front side of the main frame 39 with the later-described ultrasound motor unit 206 attached to the main frame 39 to fit the key sections 19a in the key slots 39c of the main frame 39. The key slots 17a of the MF ball presser 17 engage with the key sections 19c of the MF ball receiver 19 to circumferentially fit the MF ball presser 17 on the outer circumference of the MF ball receiver 19, and in order to press bearing balls, which will be described later, the MF ball presser 17 and the MF ball receiver 19 are attached to each other in such a manner that they can slide on each other in the optical axis direction. With the attachment state, the inclined surfaces 17d and 19d face each other, forming a V-shape (see FIG. 38).

Next, a plurality of bearing balls 100 are placed between the inclined surfaces 17d and 19d, and while the recessed inner circumference of the MF rotor 18 is fitted on the outer circumferences of the balls 100, the distance ring 50 with the distance ring spring 49 attached is fitted on the outer circumference of the MF rotor 18. Furthermore, the front cover 42 is inserted to be fitted on the outer circumference of the main frame 39 from the front side of the distance ring 50, and the locking protrusions 42a engage with the locking slots 39e via the key slots 39c. With this engagement state, two knock pins 102 are fitted in the knock pin holes 42b of the front cover 42 and further in the U slots 19b of the MF ball receiver 19, thereby the front cover 42 and the MF ball receiver 19 are integrated and fixed to the outer circumference of the main frame 39. With this fixing state, a front lid 52 is attached to the front surface of the front cover 42 to prevent the knock pins 102 from coming off.

With the aforementioned attachment state, the MF ball presser 17 is held in such a manner that the MF ball presser 17 can make relative movement only in the optical axis direction, and receives a force for pressing backward, which is generated by the distance ring spring 49. Thus, with the pressing force generated by the distance ring spring 49, each of the plurality of bearing balls 100 is held on the three surfaces of the recessed inner circumference portion of the MF rotor 18, and the V slot formed of the inclined surface 17d of the MF ball presser and the inclined surface 19d of the MF ball receiver 19. Furthermore, the plurality of bearing balls 100 are held in a state in which the plurality of bearing balls 100 are respectively fitted in the U slots 13a of the MF retainer 13 of the ultrasound motor unit 206 inserted from the back side of the bearing balls.

With the aforementioned bearing ball holding state, upon the distance ring 50 being operated to rotate, the MF retainer 13, and the LD rotor receiver 10 and the LD rotor 9 fixed to the retainer are driven to rotate by revolution of the bearing balls 100. As shown in the cross-sectional view in FIG. 38, there is almost no slippage of the balls, and accordingly, where θ is the angle between the inclined surfaces 17d and 19d and R is the radius of a bearing ball, the transmission ratio Kr between the distance ring 50 and the MF retainer 13 can be calculated by $$Kr=H/(H+R).$$

Since $H=R \cdot \sin(\theta/2)$, the transmission ratio can be calculated by $$Kr=\sin(\theta/2)/(\sin(\theta/2)+1) \qquad (1).$$

As indicated in formula (1), the transmission ratio Kr varies according to the angle θ between the inclined surfaces 17d and 19d. Here, assuming θ=90°, the transmission ratio Kr is 0.41. In the case of the present embodiment, the rotation angle of the LD frame 6 from infinity focusing to close focusing is 41° (which is the same as the rotation angle of the MF retainer 13), and thus, the rotation angle of operation of the distance ring 50 from infinity focusing to close focusing is approximately 99°.

Also, the distance ring 50 can be rotated more lightly by the amount of the rotation of the distance ring 50 reduced as described above. On the other hand, from the MF retainer 13 side (i.e., the LD rotor 9 side), the speed of the distance ring 50 is increased, the rotation load of the distance ring 50 on the LD rotor 9 is increased by the amount of the aforementioned speed increase, which is advantageous for focusing driving by means of the later-described transducers 3. In other words, during time of AF driving by means of the transducers 3, it is preferable that: the LD rotor 9 is motionless; and the rotation load of the distance ring 50 is large.

Next, the ultrasound motor unit will be described.

The ultrasound motor unit 206, as shown in FIGS. 3, 15, 16, 36 and 39, etc., includes the LD (lens driving) frame 6, a transducer holder 2, a transducer unit including the transducers 3, transducer pressing springs 11, transducer presser plates 14 and transducer FPCs 4, the LD rotor 9, the LD rotor receiver 10, an LD ball presser 7, bearing balls 99, an LD retainer 8, an MF retainer 13 and a motor FPC 5 for ultrasound motor connection.

The LD frame 6, as shown in FIG. 15, is a cylindrical frame member, which upon being driven to rotate, drives the focusing lens to advance/withdraw. In other words, the LD frame 6 is driven to rotate both ways within a predetermined angle range as a result of driving the transducers 3 or operating the distance ring 50 to rotate, and the rotation of the LD frame 6 is conveyed to the outer and inner interlock rings 65 and 63 to drive the front second lens group 212 and the rear second lens group 213 forming the focusing lens to advance/withdraw to a focusing position.

The LD frame 6 is provided with a pair of wall-shaped transducer mounting sections 6e that stands in the outer circumferential direction at positions axially symmetric with respect to the optical axis to each other and one wall-shaped scale base mounting section 6h that stands in the outer circumferential direction at a position between the transducer mounting sections 6e on the rear end side, key slots 6a for the outer interlock ring at the front end, a ball presser connection thread 6g at the outer circumference on the front end side, and a solvent infusion hole 6b (see FIG. 40) in the vicinity of the connection thread, and a circular arc (arcuate) scale base plate 15 is attached to the outer circumference.

The LD frame 6 is rotatably attached to the main frame 39 by circumferentially fitting the inner circumference of the LD frame 6 on the outer circumference of the main frame 39 in a state in which the later-described LD ball presser 7 is fixed to the front end of the LD frame 6 via engaging screws, and the LD frame 6 is supported by the main frame 39 with movement in the optical axis direction of the front end restricted by the MF ball receiver 19 via the LD ball presser 7 and with movement in the optical axis direction of the rear end restricted by the circumferential rib of the main frame 39.

The LD rotor 9 is a ring-shaped rotary member formed of a ceramic material.

The LD rotor receiver 10, as shown in FIG. 15, is a ring-shaped frame member, and is integrated with the LD rotor 9 by its rear end surface being in contact with and thereby attached to the LD rotor 9. The front surface of the LD rotor receiver 10 is provided with a circumferential V slot in which the bearing balls 99 supported by the LD retainer 8 revolve. The bottom of the V slot is provided in the optical axis direction, and thus, the bearing balls 99 are pressed in the optical axis direction. Furthermore, a ring section 10b protruding forward so as to cover the V slot is provided. The later-described MF retainer 13 is fixed to the ring section 10b via screws.

The LD rotor 9 is attached to the rear end surface of the LD rotor receiver 10 with a thermoset epoxy adhesive. The adhesion affects the performance of the ultrasound motor unit 206 if the adhesion contains air bubbles or breaks. Therefore, the inner circumferential connection portion of the LD rotor receiver 10 is provided with an adhesive reservoir 10a in the form of a notch, enabling confirmation of sufficient adhesion by confirming that the adhesive run off to the adhesive reservoir 10a. Also, since the adhesive reservoir 10a is a notch extending over the entire circumference, the adhesive easily extends over the entire circumference.

Also, as described above, since the LD rotor 9 is formed of a ceramic material, which is easily affected by impacts, and thus, if the LD rotor 9 is subjected to an impact due to, e.g., dropping, and its parts deform and come into contact with other members, the LD rotor 9 may be broken. Therefore, as shown in FIG. 37, the gap C3 formed by the outer circumference of the LD rotor 9 and the inner circumference of the middle cover 41 is made to be larger than the space C1 formed by the outer circumference of the LD rotor receiver 10 and the inner circumference of the distance ring 50, and also, the gap C4 formed by the inner circumference of the LD rotor 9 and the outer circumference of the LD frame 6 is made to be larger than the gap C2 formed by the inner circumference of the LD rotor receiver 10 and the outer circumference of the LD frame 6. As described above, the LD rotor 9 is prevented from being broken, by providing large space around the LD rotor 9 so as not to come into contact with other members in the case of, e.g., the LD rotor 9 being dropped as described above.

As will be described later, drive elements 3a of the transducers 3 attached to the LD frame 6 are in contact with the rear end surface (interface) of the LD rotor 9, and the frictional force caused by the contact generates a driving force between the drive elements 3a and the LD rotor 9. Meanwhile, the fitting part of the middle cover 41 and the distance ring 50 is positioned in the vicinity of the outer circumference of the LD rotor 9, the fitting part is provided with drip-proof packing 143 and smoothing grease is applied to the fitting part. Adherence of the grease to the rear end surface of the LD rotor 9 may result in insufficient conveyance of the driving force generated by the drive elements 3a. Therefore, as shown in FIGS. 36 and 37, the rear end surface of the LD rotor 9, and the fitting part of the middle cover 41 and the distance ring 50 are arranged as far away as possible from each other in the optical axis direction, preventing occurrence of the aforementioned failures.

The LD ball presser 7, as shown in FIGS. 15 and 40, is a ring-shaped member, and its rear end is provided with a circumferential V slot where the bearing balls 99 revolve in such a manner that the circumferential V slot faces the V slot of the LD rotor receiver 10 in the optical axis direction, and the inner circumference of the rear end is provided with a connection thread 7g to be connected to the LD frame 6.

The bearing balls 99 are sandwiched between the V slots of the LD rotor receiver 10 and the LD ball presser 7. With the bearing balls sandwiched, the connection thread 6g and the connection thread 7g of the LD ball presser 7 are connected at the front end of the LD frame 6, and then the thread connection part are bonded for preventing loosening, thereby the LD frame 6 and the LD ball presser 7 being integrated.

When there arise a need to release the thread connection between the LD frame 6 and the LD ball presser 7, a solvent is infused from the solvent infusion hole 6b of the LD frame 6 to dissolve the adhesive, enabling loosening the connection between the connection threads 6g and 7g to be separated (see FIG. 40).

The LD rotor receiver 10 and the MF retainer 13 are integrated by fitting the MF retainer 13 in the LD rotor receiver 10 from the front side of the inner circumference of the ring section 10b of the LD rotor receiver 10, screws 118 are inserted to connect with screw holes in the MF retainer. As described above, at the front end of the MF retainer 13, the plurality of U slots 13a are provided in the optical axis direction, and the bearing balls 100 in the transmission mechanism 205 are respectively inserted into the U slots 13a.

While the LD ball presser 7 and the LD rotor receiver 10 are made of metal for long life, impact resistance and also for the properties of the ultrasound motor unit 206, a resin-molded product is used for the LD retainer 8 because of low cost and high sliding property. However, since there is a difference between the resin-molded LD retainer 8 and the surrounding metal parts in thermal expansion coefficient, the LD retainer 8 has dimensions not to interfere the surrounding metal parts because of expansion/contraction of the LD retainer due to fluctuations in external temperature.

The transducers 3, as shown in FIG. 39, etc., includes a rectangular parallelepipedal laminated piezoelectric body with one surface provided along a plane perpendicular to the optical axis in the attached state, and the pair of drive elements 3a with a space therebetween in the circumferential direction of the optical axis provided on and fixed to the front surface side of the perpendicular surface of the laminated piezoelectric body. The drive elements 3a are fixed by bonding to the laminated piezoelectric body. Since the bonding state largely affects the performance of the ultrasound motor, after plasma cleaning, the drive elements 3a are bonded to the laminated piezoelectric body by a thermoset epoxy adhesive. On the back surfaces of the transducers 3, the transducer holder 2 having a U-shaped cross section along the optical axis (radial direction) is provided by being molded integrally with the transducers 3, as a member that holds the transducers.

The pair of the transducers 3 are pressed by the two transducer mounting sections 6e standing on the outer circumference of the above-described LD frame 6 via the transducer holder 2 by means of the transducer pressing springs 11, and attached to the two transducer mounting sections 6e in the state in which the transducers are pressed by the LD rotor 9.

The further details of the aforementioned transducer mounting structure will be described. At the center of the back surface of the transducer holder 2, protrusions 2a are formed. The tip of each protrusion 2a is formed to have a minute flat plane. In order to closely attach the drive elements 3a to the LD rotor 9, it is desirable that each protrusion 2a is formed to have a spherical surface so that the protrusion 2a is in contact with the transducer pressing spring 11 at a point in a manner in which oscillation of the transducer 3 is not restricted. However, in the point contact state, the protrusion may be worn away. Therefore, as described above, the tip of the protrusion 2a is made to be a minute flat plane to prevent wear.

The transducer holder 2 is held between the transducer pressing plates 14 and the LD frame 6 in the transducer thickness direction (the radial direction of the optical axis). In order to closely attach the drive elements 3a to the LD rotor 9, it is necessary to hold the transducers 3 in such a manner that the transducers 3 can freely move in the optical axis direction and freely oscillate also around an axis perpendicular to the optical axis. Accordingly, it can be considered preferable that the transducer holder 2 is held by a cylindrical member in the transducer thickness direction. However, in the case where the transducer holder 2 is held by a cylindrical member, the transducer holder 2 and the cylindrical member are in contact with each other with a line, which may cause backlash as a result of wear. Therefore, the protrusions 2b of the transducer holder 2 in the transducer thickness direction as an oscillation supporting shaft section is formed in the shape of a small rectangular column. Also, in order not to use a slide type for a mold for the transducer holder 2, relief sections 14a are provided on the rear end side in the circumferential direction of the protrusion insertion holes of the transducer pressing plates 14 to release burrs generated during molding of the transducer holder 2 (see FIG. 17). Also, with regard to oscillation, the width and the fitting length of the protrusions 2b are substantially the same and only a small amount of oscillation is required, and thus, there is no problem even if the protrusions 2b has a rectangular column shape.

Each transducer pressing spring 11 is formed of a plate spring, and are provided with a fitting hole 11a at one end and an elongate hole 11b at the other end. The transducer mounting sections 6e of the LD frame 6 are provided with two screw holes 6i spaced in the circumferential direction, and two adjustment screws are inserted into the screw sections. The tip 12a of one of the adjustment screws 12 is fitted in the fitting hole 11a of the transducer pressing spring 11, and the tip 12a of the other adjustment screw 12 is fitted in the elongate hole 11b of the transducer pressing spring 11. The protrusion 2a of the transducer holder 2 comes into contact with the center portion of the transducer pressing spring 11 (see FIG. 39). The base of the tip 12a of each adjustment screw 12 is a conical shape section 12b to prevent backlash from being generated between the adjustment screw 12 and the fitting hole 11a/the elongate hole 11b, thereby preventing occurrence of abnormal sounds during driving.

The drive elements 3a fixed to the transducer 3 are attached to the rear end surface of the LD rotor 9 in such a manner that the drive elements 3a are closely attached to the LD rotor 9 by means of a pressing force by the transducer pressing springs 11. The contact force amount of these drive elements 3a largely affects the performance of the ultrasound motor, and in the present embodiment, the amount is adjusted by the insertion amount of the adjustment screws 12 so that approximately 15N can be obtained.

Each transducer FPC 4 is bonded with the transducer 3 by a thermoset conductive epoxy adhesive with its electrode portion in contact with the electrode portion of the transducer 3 for electrical conduction. Also, the transducer FPC 4 is provided with a U-shaped flexure section 4a so as not to provide a load on the movement of the transducer 3 (see FIGS. 16, 17).

The motor FPC 5 is a FPC for connecting the transducer FPCs 4 and a sub-board 77, which will be described later, and includes connection sections 5a to be connected via solder to the transducer FPCs 4, a connector connection piece 5d for connecting with the sub-board 77, and an section 5c that can easily be flexed provided between a connection section 5a and the connector connection piece 5d. The motor FPC 5 is positioned in the outer circumference of the LD frame 6 by a FPC fitting hub 6c and fixed to the LD frame 6 via screws 98, and furthermore, the connector-side extending-out section of the motor FPC 5 is fixed to the outer circumferential surface of the main frame 39 via a FPC presser 134, and a double-stick tape (see FIGS. 15 and 17). Then, the FPC 5 connects the LD frame 6 and the main frame 39 with each section 5c flexed in a U shape.

With the motor FPC 5 attached, the LD frame 6 is rotated relative to the main frame 39 during focusing driving, as described above, the rotation of the LD frame 6 is enabled by flexing the section 5c in a U shape (flexure section 5b). FIGS. 42 and 43 show flexure of the motor FPC 5 in states in which the LD frame 6 is rotated to an infinity focusing position and a close distance focusing position.

As shown in FIG. 44, if there is an overly large space between the flexure section 5b and the inner fixed section 5f, when the section 5c returns to the original position, the intermediate section 5g is flexed first by a force of the FPC returning to a flat plane (resistance), which cannot achieve the state shown in FIG. 42. Therefore, the positions of the inner and outer fixed sections 5f and 5e and the length of the FPC between the fixed sections 5f and 5e are set so that the space between the flexure section 5b and the inner fixed section 5f becomes overly large in a movable range.

The above-described transducer unit including the transducers 3, the drive elements 3a, the transducer holder 2, the transducer pressing springs 11 and the transducer FPCs 4 is formed of a small unit for versatility.

Upon a driving voltage being applied to the laminated piezoelectric bodies of the transducers 3 via the electrode sections as described later, the laminated piezoelectric bodies repeat combination oscillation of flexure oscillation and longitudinal oscillation, and the drive elements 3a elliptically oscillate in the circumferential direction. The LD rotor 9 is in contact with the drive elements 3a, and as a result of the elliptic oscillation, the transducers 3 circumferentially move relative to the LD rotor 9 and the LD rotor receiver 10.

Upon the transducers 3 being driven with the distance ring 50 at rest, the transducers 3 circumferentially move relative to the LD rotor 9 and the LD rotor receiver 10, thereby the LD frame 6 rotating around the optical axis. The rotation of the LD frame 6 is conveyed to a rear second group frame 27 via the later-described outer and inner interlock rings 65 and 63 to perform focusing.

For the limit of the driving condition under which the aforementioned focusing driving can be performed by the ultrasound motor unit 206, that is, the condition for driving the LD frame side (the LD frame 6, the outer and inner interlock rings 65 and 63, and the rear second group frame 27, etc.) to rotate while the LD rotor side (the LD rotor 9, the LD rotor receiver 10, the distance ring 50, etc.) remaining at rest, it is necessary that a torque TK0 required for rotating the LD rotor side be larger than a torque TL0 required for rotating the LD frame side. In other words, it is necessary that:

$$TK0 > TL0 \quad (2).$$

TK0 and TL0 can be obtained by $$TK0 = TK + IK \times \alpha max \quad (3); \text{ and}$$

$$TL0 = TL + IL \times \alpha max \quad (4),$$

provided that: TK is a torque caused by a slide section friction force required for rotating the LD rotor side and the viscosity of the grease; IK is an equivalent inertia moment of the LD rotor side converted on the optical axis; TL is a torque caused by a slide section friction force required for rotating the LD frame side and the viscosity of the grease; IL is an equivalent inertia moment of the LD frame side converted on the optical axis; and αmax is a maximum angular acceleration of relative rotational motion between the LD rotor and the LD frame during an AF operation.

Also, A torque TS required for relatively rotating the LD rotor 9 and the LD frame 6 against a friction force between the LD rotor 9 and the drive elements 3a with the transducers 3 at rest is made to be:

$$TS > TL + IL \times \alpha max \quad (5).$$

Here, an operation of the transducers 3 will be described in details. Each of the pair of the transducers 3 is provided with two sets of driving electrodes and a set of oscillation detection electrodes. When driving signals having a predetermined phase difference are applied to the two sets of driving electrodes, elliptic oscillations having phase difference are generated in the two drive elements 3a sections. Since the drive elements 3a are suppressed by the LD rotor 9 via the transducers 3 by means of the transducer pressing springs 11, as a result of the elliptic oscillations of the drive elements 3a, the transducers 3 receive a circumferential force relative to the LD rotor 9 due to the friction force between the drive elements 3a and the LD rotor 9. Relative to the LD rotor 9, the LD ball presser 7 integrated with the LD frame 6 is supported by the bearing balls, and rotates around the optical axis. In other words, the LD frame 6 rotates together with the transducers 3.

Then, a front second group frame 28 and the rear second group frame 27 are driven to advance/withdraw via the outer and inner interlock rings 65 and 63 to perform focusing.

Since the two drive elements 3a provided in each of the pair of the transducers 3 elliptically oscillate in different phases, the two drive elements 3a relatively move with respect to the LD rotor 9. Also, the pair of the transducers 3 is provided with the same signal and operate in synchronization. Signals generated from the oscillation detection electrodes are used for feedback control.

The LD frame 6 is provided with a base plate mounting section 6h standing on the outer circumference, and the mounting section 6h is provided with two elongate holes 6d extending in the circumferential direction and two screw holes 6f (see FIG. 28). Also, the scale base plate 15 is provided with two rotation stopping protrusions 15a protruding forward in the optical axis direction, two circumferential elongate holes 15c, and stoppers 15b1 and 15b2 protruding backward in the optical axis direction at a mounting section protruding in a direction perpendicular to the optical axis on the inner circumferential side of the circular arc (arcuate) plate (see FIGS. 29 and 31). These stoppers 15b1 and 15b2 restrict the rotation of the LD frame 6 at the rotation limit position of the LD frame 6 on the infinity focusing side or close focusing side, by coming into contact with a stopper 41a on the stopper middle cover 41 side.

The scale base plate 15 is put on the mounting section 6h of the LD frame 6, the protrusions 15a are inserted into the elongate holes 6d, the circumferential position of the scale base plate 15 is adjusted (later-described ZP adjustment) and screws 106 inserted into the elongate holes 15c are fitted into the screw holes 6f, whereby the scale base plate 15 is fixed to the LD frame 6 (see FIG. 31). A scale sheet 16 with numerical values indicating distances to a focused subject printed thereon is attached to the outer circumferential surface of the scale base plate 15 (see FIG. 16), and with the assembled state, the scale sheet 16 is positioned on the inner side of the scale indication window 41c of the middle cover 41, enabling viewing the focused subject distances from the outside (see FIG. 20).

The aforementioned ZP adjustment is an adjustment for providing an offset to focusing so that displacement of a focal position relative to each subject distance caused by zooming, more specifically, displacement of the position to which the LD frame 6, which is driven to rotate during focusing, is rotated relative to the main frame 39. For the method of the adjustment, the position of the scale base plate 15 relative to the LD frame 6 is adjusted via the elongate holes 15c and the screws 106 are fastened so that in a focused state, the subject distance value on the scale sheet 16 matches index lines 41d provided on the scale indication window 41c of the middle cover 41. In the adjustment of the position of the scale base plate 15, the positions of the infinity focusing side stopper 15b1 and the close focusing side stopper 15b2 relative to the stopper 41a on the middle cover 41 side are also adjusted, whereby the rotation range of the LD frame 6 is limited to a proper rang, which will be described later.

An angle from the infinity focusing or close focusing position to the position where the LD frame 6 comes into contact with the stopper 41a for restriction of the LD frame rotation greatly varies depending on the aforementioned ZP adjustment. In the lens barrel 1 according to the present embodiment, the angle provided by the ZP adjustment is approximately ±3°. At least approximately 3° is required for the angle from the infinity focusing or close focusing position to the stopper considering temperature properties and various adjustment errors. In other words, the angle to the infinity focusing position or close focusing position is 6°±3°. For example, there may be a case where the angle from the close focusing position to the stopper 3° for an individual product while the angle is 9° for another individual product. For a lens barrel that performs electrical control for both AF and MF, the mechanical stopper position is not so problematic because the LD frame is stopped by control. However, in the case of a lens barrel enabling manual rotation of the LD frame 6 by means of the distance ring 50, it is not convenient in terms of operation if the stopper is not adjusted. Also, it is possible to be used to exceed the range for which optical designing assures. Therefore, in the lens barrel 1 according to the present embodiment, as described above, a scale adjustment and a stopper position adjustment can be performed at the same time. Consequently, the angle from the infinity focusing or close focusing position to the position where the stopper works automatically turns to a fixed angle when the scale base plate 15 is adjusted, eliminating individual product differences caused by adjustment. In the present embodiment, the adjustment amount is approximately 3°, which is the amount for the aforementioned temperature properties and various adjustment errors.

Next, the configurations of a portion around the cam frame and the outer and inner interlock rings will be described.

The cam frame drive ring 61 and the cam frame 60, as shown in FIGS. 3 and 22, etc., are formed of a ring-shaped member and a cylindrical frame member, and circumferentially fits on the outer circumference of the fixed frame 57 in such a manner that the cam frame drive ring 61 and the cam frame 60 can be rotated or rotationally advanced or retreated.

The cam frame drive ring 61 is provided with an engaging slot 61c to engage with the tip of the zoom drive piece 56 of the zoom ring 53 at the circumference, three cam frame keys 61b protruding forward, and locking pin insertion slots 61d provided at three positions in the circumference.

The cam frame drive ring 61 is fitted on the outer circumference of the fixed frame 57 from the front side of the fixed frame 57 with a zoom plate spring 87 inserted on the rear portion of the cam frame drive ring 61, and the rear end surface of the cam frame drive ring 61 is made to be in contact with the rib 57a. In that state, locking pins 62 are inserted into and penetrate the insertion slots 61d to fit in the circumferential slot 57b for locking pins of the fixed frame 57, and then, the cam frame drive ring 61 enters a state in which the cam frame drive ring 61 can rotate relative to the fixed frame 57 and is restricted from movement in the optical axis direction. The locking pins 62, after being inserted into the insertion slots 61d, are restricted from coming off by step sections 61a at the ends of the insertion slots 61d (see FIG. 12).

When the fixed frame 57 with the cam frame drive ring 61 attached is inserted into the inner circumference of the main frame 39, the rear end of the fixed frame 57 is fixed to the main frame 39, and the engaging slot 61c of the cam frame drive ring 61 is engaged with the tip of the zoom drive piece 56 of the zoom ring 53 (see FIG. 12), rotation of the zoom ring 53 is conveyed to the cam frame drive ring 61.

The zoom plate spring 87 is held between the inner circumferential step section of the main frame 39 and the outer circumferential step section of the cam frame drive ring 61, and is kept in an elastically deformed state. Accordingly, the cam frame drive ring 61 is pressed forward by the zoom plate spring 87 to enter a state in which the cam frame drive ring 61 is held with a predetermined frictional rotation force relative to the main frame 39, and thus, the zoom ring 53 connected to the cam frame drive ring 61 via the zoom drive piece 56 does not accidentally rotate.

The cam frame 60 is provided with: three 1Z cam slots (slots with a bottom) 60a, three 4Z cam slots 60b, three 3ZS cam slots 60c as cam slots extending obliquely relative to the optical axis in the circumference; 2Z inclined linear slots (slots with a bottom provided at the inner circumferential surface) 60d; and key slots 60e for the cam frame drive ring, extending in the optical axis direction with their rear ends opened.

The cam frame 60 is fitted on the outer circumference of the fixed frame 57 with the cam frame drive ring 61 attached. Then, cam followers 23 are fitted in the cam slots 57c for the cam frame of the fixed frame 57 and fixed to the inner circumference of the cam frame 60 via screws 96 inserted from the outer circumference of the cam frame 60. Each cam follower 23 has a parallel step section 23a in a direction perpendicular to the axis center of the screw hole 23b (see FIG. 32), and when the cam followers 23 are fixed to the cam frame 60, fastening of the screws 96 causes the step sections 23a to go into the inner circumferential surface of the cam frame 60, and thus, the step sections 23a function as stoppers for rotation of the cam followers 23 during screws being attached, enabling firmly fastening the screws 96 (see FIG. 33).

The key slots 60e of the cam frame 60 is engaged with the cam frame keys 61b of the cam frame drive ring 61 to interlock the cam frame 60 and the cam frame drive ring 61.

When the cam frame drive ring 61 is rotated with the above-described cam frame attached state, the cam frame 60 moves forward and backward by means of the cam follower 23 and the cam slots 57c in the optical axis direction while rotating integrally with the cam frame drive ring 61 via the keys 61b.

When a 1Z frame 21 is pulled toward in the optical axis direction in an overuse state, the cam frame 60 moves forward following the 1Z frame 21, coming close to the cam frame keys 61b coming off from the key slots 60e of the cam frame 60. However, since a minute protrusion 61b0 extending in the optical axis direction is provided on one side of the tip of each cam frame key 61b, the keys 61b do not come off from the key slots 60e (see FIG. 34).

The outer interlock ring 65 and the inner interlock ring 63, as shown in FIGS. 3, 20 and 22, etc., are ring-shaped members, which convey rotation of the LD frame 6 during focusing to the rear second group frame 27.

The outer interlock ring 65 includes protruded key sections 65a protruding in the optical axis direction, which engage with the key slots 6a provided at the rear end of the LD frame, at the front end (see FIG. 17), and a SMD scale 44 is attached to the inner circumference of the outer interlock ring 65, and furthermore, a distance contact point 80 is fastened to the outer interlock ring 65 with a screw. At the rear end surface of the outer interlock ring 65, a focus drive piece 66 protruding on the inner circumferential side is fixed via screws.

The outer interlock ring 65 is circumferentially fitted on the outer circumference of the main frame 39 and thereby attached to the main frame 39 with movement of the outer interlock ring 65 in the optical axis direction restricted. The key sections 65a are engaged with the key slots 6a (see FIG. 17) provided at the rear end of the LD frame, and the focus drive piece 66 is inserted into an insertion slot 39f of the main frame 39 to engage the tip 66a of the focus drive piece 66 with an engaging slot 63a of the inner interlock ring 63.

A focus interlock key 64 extending forward in the optical direction is fixed via a screw and bonding to the inner circumference of the inner interlock ring 63.

The inner interlock ring 63 is rotatably fitted on the rear end of the outer circumference of the fixed frame 57, and thereby attached to the fixed frame 57 with movement of the inner interlock ring 63 in the optical axis direction restricted. The focus interlock key 64 is slidably fitted in an arm key slot 27a of the rear second group frame 27.

Rotation of the LD frame 6 is conveyed from the outer interlock ring 65 to the inner interlock ring 63 by the focus drive piece 66, and further is conveyed to the rear second group frame 27 via the focus interlock key 64 of the inner interlock ring 63, thereby focusing driving being performed.

With the aforementioned state of the outer interlock ring 65 attached to the main frame 39, the distance contact point 80 is in contact with the distance encoder 129 of the main frame 39. When the outer interlock ring 65 is rotated as a result of the LD frame 6 being operated to rotate, a code signal indicating an LD frame focus rotational position corresponding to the absolute position of the distance contact point 80 is outputted from the distance encoder 129.

Also, the SMD sensor 131 on the main frame 39 side is positioned facing the SMD scale 44 attached to the inner circumference of the outer interlock ring 65 (see FIG. 41). The gap in the radial direction between the SMD scale 44 and the SMD sensor 131 is adjusted to a predetermined gap by an adjusting washer 46 inserted onto the rear surface of the FPC 47 for an SMD on which the SMD sensor 131 is mounted (see FIG. 21).

The SMD sensor 131 is a sensor that outputs two types of signals, i.e., a signal according to a 20 μm-pitch black and white pattern of the SMD scale 44 and a signal having a phase different from the pattern by 90° enabling provision of a 5 μm-pitch resolution and rotation direction detection. For the SMD sensor, the detailed technique is disclosed in Japanese Patent Application Laid-Open Publication No. 2005-283457 (especially, paragraphs 0016 to 0024) as a sensor head. Also, the SMD sensor 131 and the SMD scale 44 may be substituted with another device, for example, a magnetic encoder, etc.

With the SMD sensor 131, the rotation angle of the outer interlock ring 65 (thus, the LD frame 6) can be detected in a 5 μm pitch converted in terms of circumferential length. However, what can be acquired by the SMD sensor 131 is relative position data, and use of an absolute position patter signal from the distance encoder 129 together with the relative position data enables detection of a high resolution absolute position.

Next, the configuration of each zoom unit will be described.

The 1Z unit 201, as shown in FIGS. 3 and 22, etc., includes a first group frame 20 holding the first lens group 211, the 1Z frame 21 supporting the first group frame 20, and a filter ring 24.

The 1Z frame 21 is a cylindrical frame member, three linear slots 21a extending in the optical axis direction are fixed to the inner circumference of the 1Z frame 21, and three cam followers 22 are fixed to the rear end of the inner circumference of the 1Z frame 21. The first group frame 20 is attached to the front end of the 1Z frame 21 with packing 144 interposed therebetween, and the filter ring 24 is further attached to the front end of the 1Z frame 21.

The 1Z frame 21 is circumferentially fitted on the outer circumference of the cam frame 60 in such a manner that the 1Z frame 21 can perform relative rotation, with 1Z guide pins 59 in the fixed frame 57 slidably engaging with the linear slots 21a. Then, the cam followers 22 are slidably engaged with the 1Z cam slots 60a of the cam frame 60. The 1Z guide pins 59 is fixed to the front end of the fixed frame 57 via screws fitted in the screw holes 57g together with a light-shielding fixed frame cover 58. With the aforementioned fitting state, the 1Z frame 21, with its rotation restricted, is driven to advance/ withdraw in the optical axis direction via the 1Z cam slots 60a in accordance with rotation and forward/backward movement of the cam frame 60.

The 2Z unit 202, as shown in FIGS. 3 and 22, etc., includes a 2Z frame 37, the front second group frame 28 holding the front second lens group 212, and the rear second group frame 27 holding the rear second lens group 213.

The rear second group frame 27 is a frame member, and the circumferential section of the rear second group frame 27 is provided with three cam slots 27b for the front second group frame and three 2Z cam slots (slots with a bottom) 27c, and a key slot 27a extending in the optical axis direction which is provided in the arm section protruding backward. The focus interlock key 64 of the inner interlock ring 63 is slidably fitted in the key slot 27a of the rear second group frame 27.

The front second group frame 28 is a cylindrical frame member, and three two-tier cam followers 29 are fixed to the outer circumference on the rear end side of the front second group frame 28. The inward sides (root section) of the two-tier cam followers 29 engage with the cam slots 27b of the rear second group frame 27, and the outward side (the tips) of the two-tier cam followers 29 engage with the linear slots 57d of the fixed frame 57. The front second group frame 28 circumferentially fits in the inner circumference of the rear second group frame 27, and is inserted to the rear second group frame 27 in such a manner that the front second group frame 28 can advance/withdraw relative to the rear second group frame 27.

The 2Z frame 37 is a ring-shaped frame member, three cam followers 37b are formed integrally with the inner circumference of the 2Z frame 37, and three cam followers 38 are fixed to protrusions 37a protruding backward from the rear end of the ring. With the inner circumferential side cam followers 37b engaging with the cam slots 27c of the rear second group frame 27, the inner circumference of the 2Z frame 37 is circumferentially fitted on the outer circumference of the rear second group frame 27. Meanwhile, with the inward sides (root sections) of the two-tier cam followers 38 fixed to the outer circumference engaging with the 2Z cam slots 57f of the fixed frame 57, and also with the outward sides (the tips) of the cam followers 38 engaging with the inclined linear slots 60d for 2Z of the cam frame 60, the outer circumference of the 2Z frame 37 is circumferentially fitted in the inner circumference of the fixed frame 57.

With the 2Z unit 202 inserted into the fixed frame 57 as described above, in the 2Z frame 37, in accordance with rotation of the cam frame 60, the cam followers 38 are driven to rotate and advance/withdraw in the optical axis direction by the 2Z cam slots 57f of the fixed frame 57 and the inclined linear slots 60d for 2Z of the cam frame 60. Also, in a state in which the inner interlock ring 63 does not rotate (in a state which focusing driving is not performed), the rear second group frame 27 is in a state in which rotation around the optical axis is restricted, and in accordance with rotation of the cam frame 60, the rear second group frame 27 is driven to advance/withdraw along the cam slots 27c by the cam followers 37b of the 2Z frame 37. Furthermore, the front second group frame 28, with rotation restricted by the linear slots 57d of the fixed frame 57, is driven to advance/withdraw by the cam followers 29 engaging the cam slots 27b of the rear second group frame 27.

The cam followers 38 of the 2Z frame 37 are fixed via screws 94, and as shown in FIG. 35, screw holes 37c are made to be blind holes to prevent generation of dust. Thus, the screw effective length of each screw hole 37c becomes short. Therefore, in the present embodiment, for providing a long screw effective length, a structure in which a projection 37d is provided on the circumference of each screw hole 37c is employed. As a result of providing the projections 37d as described above, the 2Z frame 37 cannot be fitted into the inner circumference of the fixed frame 57 as it is. Therefore, in the present embodiment, portions around the protrusions 37a where the screw holes 37c are provided are once made to elastically deform inwardly and fitted in the fixed frame 57, and then, the cam followers 38 are inserted into the cam slots 57f and the inclined linear slots 60d from the outer circumferential side and screw fastening is performed.

The 3ZS unit 203, as shown in FIGS. 3 and 22, etc., includes a third group frame 30 holding the third lens group 214, a 3ZS frame 31 holding the third group frame 30 and also holding a diaphragm plate 34, diaphragm blades 33 and a diaphragm pressing plate 32, the diaphragm actuator 132 supported by the 3ZS frame, and a diaphragm actuator FPC 78.

Three cam followers 73 are fixed to arm section provided in three directions on the outer circumference of the 3ZS frame 31, and the outer circumferences of the arm sections are circumferentially fitted in and thereby incorporated in the inner circumference of the fixed frame 57. Then, the cam followers 73 are fitted into the linear slots 57e of the fixed frame 57, and further fitted in the 3ZS cam slots 60c of the cam frame 60. In accordance with rotation of the cam frame 60, the 3ZS frame 31 is driven to advance/withdraw in the optical axis direction by the 3ZS cam slots 60c, in a state in which rotation of the 3ZS frame 31 is restricted by the linear slots 57e.

The 4Z unit 204, as shown in FIGS. 3 and 22, includes a fourth group frame 35 holding the fourth group lens 215, and a 4Z frame 36 holding the fourth group frame 35. The 4Z frame 36 includes arm sections protruding in three direction on the outer circumference, and cam followers 93 are fixed to the arm sections. The 4Z frame 36 is incorporated into the fixed frame 57 by circumferentially fitting the outer circumferences of the arm sections on the inner circumference of the fixed frame 57. Then, the cam followers 93 are fitted into the linear slots 57d of the fixed frame 57, and further fitted into the 4Z frame cam slots 60b of the cam frame 60. In accordance with rotation of the cam frame 60, the 4Z frame 36 is driven to advance/withdraw in the optical axis direction by the 4Z frame cam slots 60b, in a state in which rotation of the 4Z frame 36 is restricted by the linear slots 57d.

States of rotation and forward/backward movement of the 1Z frame 21, the 2Z frame 37, the front second group frame 28, the rear second group frame 27, the 3ZS frame 31 and the 4Z frame 36 by means of the cam frame 60 or the inner interlock ring 63 are shown in the schematic diagrams in FIGS. 45A, 45B, 46A and 46B. Also, states of rotation and advancement of the 2Z frame 37 by means of the cam frame 60 are shown in the development diagrams in FIGS. 47A and 47B. When the cam frame drive ring 61 moves in the m0 direction (in the development diagram), the cam frame 60 is caused to advance in the m1 direction while rotating, and accordingly, the 2Z frame 37 is caused to advance in the optical axis direction while rotating, by means of the cam slots 57f and 60d.

Next, the configuration of the rear end portion of the barrel will be described.

At the rear end portion of the barrel, as shown in FIGS. 3 and 24, etc., an outer cover ring 67, an inner cover ring 68, a main FPC 76, a sub-board 77, which is formed of a hard board, a main FPC guide plate 70, a contact point base 79, an adjusting washer plate 86 and the lens mount 89 are provided on the rear portion of the inner circumference of the fixed frame 57.

The outer cover ring 67 is a cylindrical member, and includes three protrusions 67c protruding from a front end surface 67b forward on the outer circumference, and linear slots 67a extending in the optical axis direction in the inner circumference. The outer cover ring 67 is fixed to the rear end of the lens mount 89 via screws.

The inner cover ring 68 is a cylindrical member, and is provided with protrusions 68a protruding at the front end of the outer circumference, and nail sections 68b protruding at the rear end of the outer circumference. A cover ring spring 69, which is formed of a coil spring, is put on the outer circumference of the inner cover ring 68 in such a manner that the cover ring spring 69 is in contact with the front end surface 67b inside the protrusions 67c of the outer cover ring and interposed between the front end surface 67b and the protrusions 68a of the inner cover ring 68. The inner cover ring 68 is fitted into the inner circumference of the outer cover ring 67 with the protrusions 68a engaging with the linear slots 67a of the outer cover ring 67. The inner cover ring 68 is pressed forward upon receipt of a pressing force from the cover ring spring 69 in a state in which rotation of the inner cover ring 68 is restricted. When the inner cover ring 68 is inserted into the outer cover ring 67, a portion around the nail sections 68b are once deformed inwardly, and inserted into and thereby engages with the outer cover ring 67 over a protruded wall surface provided at the front ends of the linear slots 67a of the outer cover ring 67, and thus, the inner cover ring 68 does not come off from the outer cover ring 67.

The outer sides of the linear slots 67a of the outer cover ring 67, with which the nail sections 68b of the inner cover ring 68 engages, slightly protrude on the outer circumference, keeping the wall thickness of the moldings (see FIG. 11). The protrusions on the outside of the linear slots 67a are positioned avoiding the members such as the main FPC 76, the sub-board 77 and the FPC guide plate 70, etc.

In a state in which the 4Z frame 36 is withdrawn to the wide-angle side, the front end surface of the inner cover ring 68 is pressed by the rear end surface of the 4Z frame 36, the inner cover ring 68 enters the inside of the outer cover ring 67, and the fourth group frame 35 is withdrawn into the inside of the inner cover ring 68 (see FIG. 7).

In a state in which the 4Z frame 36 is advanced to the telephoto side, the front end surface of the inner cover ring 68 is released, the inner cover ring 68 moves forward in the optical axis direction by means of a pressing force from the cover ring spring 69, and the rear end of the fourth group frame 35 and the front end of the inner cover ring 68 slightly overlap (see FIG. 6). Between the wide-angle state and the telephoto state, the state of the front end surface of the inner cover ring 68 and the rear end surface of the 4Z frame 36 is switched to/from a contact state from/to a spaced state, but the rear end of the fourth group frame 35 on the rear end surface side of the 4Z frame 36 does not move away from the front end surface of the inner cover ring 68 all the time.

Accordingly, in a range including from the wide-angle state to the telephoto state, no gap is generated between the rear side opening of the lens mount 89 and the rear end of the fourth group frame 35 inside the barrel, preventing unwanted light (stray light) from that portion from entering the photographic optical path. Conventional lens barrels have employed extendable members such as bellows for obliquely-extending members. However, since such members require large space in the radial direction, a problem has been arisen in arrangement of the later-described main FPC and etc. The present embodiment, as described above, employs the two-tier structure of the outer cover ring 67 and the inner cover ring 68, which is pressed by the cover ring spring 69 and relatively moves, enabling the aforementioned members to be efficiently provided in a small space in a condition in which light is completely shielded.

Control elements such as the CPU 251, and connectors 76a, 76b and 76C are mounted on the main FPC 76, and the main FPC 76 is also provided with a connection piece 76d for connecting with the sub-board 77. Other control elements and connectors 77a, 77b and 77C are mounted on the sub-board 77.

A connection piece of the diaphragm actuator FPC 78 is connected to the connector 76a of the main FPC 76, a FPC connection piece of the zoom encoder 130 is connected to the connector 76b, and a FPC connection piece of the distance encoder 129 is connected to the connector 76c. Furthermore, the connection piece of the motor FPC 5 is connected to the connector 77b of the sub-board 77, and a FPC connection price of the FPC 47 for an SMD is connected to the connector 77c. The main FPC 76 and the sub-board 77 are connected via the connector 77a.

The main FPC 76 connected to the sub-board 77 is attached to the main FPC guide plate 70, and the guide plate 70 is fixed to the rear end surface of the main frame 39 via screws (see FIG. 3). The sub-board 77 and the main FPC 76 are provided in a void space between the outer circumference of the outer cover ring 67 and the inner circumference of the fixed frame 57 (see FIG. 11).

The lens mount 89 is fixed to the rear end surface of the main frame 39 via screws in a state in which the contact point base 79 is attached to the front surface side of the lens mount 89 with the adjusting washer plate 86 for back focal distance adjustment interposed therebetween.

Here, the shapes of the cam slots for driving the 2Z frame will be described. As described above, the cam followers 37b in the 2Z frame 37 move in the cam slots 27c in the rear second group frame 27 during zooming and during focusing. This is intended to correct the difference in advancement amount for focusing depending on the zoom position by means of a simple mechanism. However, the relationship between the rotation angle and the focal point distance is substantially uniquely determined, causing the following problems:

(1) The rotation amount for zooming is roughly determined by the rotation amount for focusing. In other words, the operation angle for zooming will be small, which may result in poor operability;

(2) Since the relationship between the rotation angle and the focal point distance (i.e., the angle of view) is roughly determined, in the case of the present embodiment, like the variation Gb of the photographing angle of view based on the rotation angle of the 2Z frame 37, which is shown in FIG. 49, variation in angle of view at the rotation angles around the wide-angle is large, which results in poor operability; and (3) In some cases, the pressure angles of the cam slots become extremely large, but it is difficult to take measures against the extremely large pressure angles except increasing the rotation angle for focusing. When inclined linear slots 60d for 2Z are made in parallel to the optical axis as in an ordinary design, the pressure angle of the 2Z cam slots 57f in the fixed frame 57 become close to 80°, the cam followers 37b does not move.

Therefore, in the present embodiment, the inclined linear slots 60d for 2Z are inclined and the shapes of the cams are determined in conformity with the inclination, thereby solving the abovementioned problems.

More specifically, problem (1) can be solved by inclining the inclined linear slots 60d for 2Z. In the case of the present embodiment, the rotation angle of the 2Z frame 37 is 67° while the potation angle of the cam frame 60 is 80°. At the same time, problem (3) can be solved. As a result of the inclined linear slots 60d for 2Z, the relative pressure angle becomes approximately 50°.

In order to solve problem (2), as shown in FIG. 48, the shape of the cam slot 57c for the cam frame 60 is set so that a movement amount variational for the 2Z frame 37 based on the cam frame 60 gradually decreases. In FIG. 48, a movement amount variation a2 indicates the movement amount of the 2Z frame 37, and a movement amount variation a3 indicates the movement amount of the cam frame 60. Since the difference in angle between the cam frame 60 and the 2Z frame 37 depends on their relative positions in the optical axis direction, the variation in relative positions in the optical axis direction of the cam frame 60 and the 2Z frame 37 become substantially zero from positions around the zoom standard position to the telephoto position and the cam frame 60 and the 2Z frame 37 rotate substantially in unison, while the position is closer to the wide position, the angle difference becomes larger. Therefore, as shown in FIG. 49, variation Ga in angle of view based on the rotation angle of the cam frame 60 (i.e., the zoom ring 53, which is a zoom operation member) does not sharply vary compared to the variation Gb in angle of view based on the rotation angle of the 2Z frame 37.

In the case of the present embodiment, the movement amount of the 2Z frame 37 based on the cam frame 60 is set to be proportional to the 6.6th power of the angle, which is selected for the cams other than those in the cam slots 57f to gradually decrease or gradually increase without having extreme values because when a cam has an extreme value, the surface in contact with the cam is switched to another around the value, which may result in unstable performance.

Zooming operation and focusing operation of the lens barrel 1 having the above-described configuration will be described with reference to FIGS. 45A, 45B, 46A and 46B, etc.

As described above, zooming is performed by operating the zoom ring 53 to rotate. Rotation of the zoom ring 53 is conveyed to the cam frame drive ring 61, and the cam frame 60 connected to the cam frame drive ring 61 via the keys move straight in the optical axis direction while rotating along the cam slots 57c of the fixed frame 57. Rotation of the 1Z frame 21 is restricted by the linear slots 21a, rotation of the 3ZS frame 31 is restricted by the linear slots 57e of the fixed frame 57, and rotation of the 4Z frame 36 is restricted by the linear slots 57d. In the rotation-restricted state, when the cam frame 60 rotates and moves forward/backward, the 1Z frame 21 moves in the optical axis direction along the cam slots 60a of the cam frame 60, the 3ZS frame 31 moves in the optical axis direction along the cam slots 60c, and the 4Z frame 36 moves in the optical axis direction along the cam slots 60b. The movement amounts of each frame member is the combination of the movement amount of the cam frame 60 and the amounts of movements along the cam slots 60a, 60b or 60c.

As shown in FIGS. 47A, 47B and 48, the 2Z frame 37, in accordance with rotation and advancement/withdrawal of the cam frame 60, rotates and move forward/backward via the cam followers 38 engaging with the cam slots 57f of the fixed frame 57 and the inclined linear slots 60d for 2Z of the cam frame 60.

Since rotation of the rear second group frame 27 is restricted by the focus interlock key 64 of the inner interlock ring 63, the rear second group frame 27 moves straight in the optical axis direction without rotating along the cam slots 27c in accordance with the rotation of the 2Z frame 37.

Rotation of the front second group frame 28 is restricted by the linear slots 57d of the fixed frame 57. During zooming, the rear second group frame 27 also does not rotate, the rotational position of the front second group frame 28 relative to the rear second group frame 27 does not change. Thus, the relative positions in the optical axis direction of the front second group frame 28 and the rear second group frame 27 do also not change, and accordingly, the front second group frame 28 and the rear second group frame 27 move straight in the optical axis direction in unison.

As described above, zooming is performed by forward/backward movement of the 1Z frame 21, the 3ZS frame 31 and the 4Z frame 36, and further, the front second group frame 28 and the rear second group frame 27, in accordance with driving the zoom ring 53 to rotate.

Next, a focusing operation will be described.

During an AF (autofocusing) operation and during an MF (manual focusing) operation, the inner interlock ring 63 rotate as a result of driving the transducer 3 or operating the distance ring 50 to rotate. Since the focus interlock key 64 secured to the inner interlock ring 63 is connected to the rear second group frame 27 via the keys, the rear second group frame 27 rotates in accordance with the rotation of the inner interlock ring 63. As a result, the rear second group frame 27 moves straight in the optical axis direction while rotating along the cam slots 27c. The front second group frame 28 does not rotate because rotation of the front second group frame 28 is restricted by the linear slots 57d of the fixed frame 57 as described above. Accordingly, when the rear second group frame 27 rotates, the front second group frame 28 moves in the optical axis direction along the cam slots 27b. The movement amount of the front second group frame 28 is the combination of the movement amount of the rear second group frame 27 and the movement amount of the cam slots 27b. Focusing is performed by the above-described forward/backward movement of the rear second group frame 27 and the front second group frame 28.

Rotation of the LD frame 6 is conveyed to the inner interlock ring 63, and the members up to the rear second group frame 27 rotate in unison all the time. Also, as described above, focusing is performed by rotation of the rear second group frame 27, and thus, an operation to rotate the LD frame 6 itself can be considered as a focusing operation.

Therefore, during an AF operation, predetermined drive signals are provided to the transducers 3 in the ultrasound motor unit 206, and the LD frame 6 to which the transducers 3 is attached and the LD rotor 9 rotate relative to each other. At this time, since formula (2) has been satisfied, AF focusing is performed by means of the LD frame 6 rotating while the LD rotor 9 not moving.

Meanwhile, during an MF operation, when a photographer rotates the distance ring 50, the LD rotor 9 rotates by the angle corresponding to the rotation changed by the transmission mechanism 205. Here, since formula (5) can be satisfied, manual focusing is performed by the LD rotor 9 and the transducers 3 moving in unison with the friction force retained, thereby the LD frame 6 rotating.

During MF driving, when a torque larger than the contact friction force between the LD rotor 9 and the drive elements 3a of the transducers 3 is applied after the stoppers 15b1 or 15b2 of the scale base plate on the LD frame 6 side coming into contact with the stopper 41a on the middle cover 41 side, slippage occurs between the LD rotor 9 and the drive elements 3a. Because of the slippage, the portion from the LD frame 6 to the rear second group frame 27 does not rotate while the portion from the distance ring 50 to the LD rotor 9 rotates. The strengths of the respective constituting members are set so that the friction force between the LD rotor 9 and the drive elements 3a at this time does not break such constituting members.

When an AF operation and an MF operation are performed simultaneously, focusing is performed by the rear second group frame 27 being driven by the combined amount.

As described above, the lens barrel 1 according to the present embodiment enables an MF operation by means of an operation to rotate the distance ring 50 and an AF operation by means of the transducers 3, and the distance ring 50 can be rotated unlimitedly while rotation of the LD frame 6 by means of the transducers 3 being limited to a predetermined angle range. As a result, it is possible to provide a lens barrel requiring no sliding contacts for supplying the transducers 3 with drive power and enabling high-speed focusing driving.

The present invention is not limited to the above-described embodiment, and in putting the present invention into practice, various modifications can be made as far as such modification do not depart from the spirit and scope of the present invention. Furthermore, the above embodiment includes the invention at various stages, and various aspects of the invention may be extracted by a proper combination of a plurality of elements disclosed.

The lens barrel according to the present invention enables driving frame members to advance/withdraw by means of both manual and electrical operations, provides easy power supply to a drive motor, and can be used as a lens barrel enabling high-speed driving, too.

Having described the embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A lens barrel comprising:
an optical system;
an operation ring to be operated to rotate around the optical system of the lens barrel;
a rotary member capable of rotating in conjunction with the rotational operation of the operation ring;
a transducer that is in contact with the rotary member and is capable of moving around the optical system and the rotary member; and
a rotatable frame member that is capable of moving around the optical system within a predetermined angle range and supports the transducer, wherein, upon the operation ring being rotated manually, the operation ring drives and rotates the rotary member, the rotary member causing the rotatable frame member to rotate integrally with the transducer to move at least a part of the optical system in an optical axis direction, and upon the transducer being driven by a drive signal, the transducer moving with respect to the rotary member at rest, to thereby rotate the rotatable frame member around the optical system to move at least a part of the optical system in an optical axis direction.

2. The lens barrel according to claim 1, wherein the transducer is provided with the drive signal by a flexible printed board.

3. The lens barrel according to claim 1, wherein the transducer includes a rectangular parallelepipedal drive element and a plurality of the transducers are provided on the frame member.

4. The lens barrel according to claim 1, wherein the part of the optical system is an optical system for focusing.

5. The lens barrel according to claim 1, wherein a transmission mechanism is provided between the operation ring and the rotary member.

6. The lens barrel according to claim 1, further comprising control means for performing control to provide the drive signal to the transducer.

7. The lens barrel according to claim 1, wherein whether or not the transducer is driven, the operation ring can arbitrarily be operated.

8. The lens barrel according to claim 1, wherein the part of the optical system is driven by a single transducer in both an auto focus mode and a manual focus mode.

* * * * *